United States Patent
Schmidt et al.

(10) Patent No.: US 10,032,126 B2
(45) Date of Patent: Jul. 24, 2018

(54) CUSTOMER CONTROLLED HOME DELIVERY

(71) Applicant: SAP SE, Walldorf (DE)

(72) Inventors: Eckehard Schmidt, Walldorf (DE); Filip Perisic, Karlsruhe (DE)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 14/743,841

(22) Filed: Jun. 18, 2015

(65) Prior Publication Data

US 2016/0371650 A1    Dec. 22, 2016

(51) Int. Cl.
*G06Q 30/00* (2012.01)
*G06Q 10/08* (2012.01)
*G06Q 30/06* (2012.01)

(52) U.S. Cl.
CPC ..... *G06Q 10/0836* (2013.01); *G06Q 30/0635* (2013.01)

(58) Field of Classification Search
CPC ......... G06Q 30/00; G06Q 30/06; G06Q 20/00
USPC .............. 705/26.7, 28.81; 235/383
See application file for complete search history.

(56) References Cited

U.S. PATENT DOCUMENTS

| | | | |
|---|---|---|---|
| 7,793,838 B2 * | 9/2010 | Appleyard | G06Q 10/087 235/382 |
| 7,797,229 B2 | 9/2010 | Doerner | |
| 8,671,027 B2 | 3/2014 | Mahajan et al. | |
| 8,751,316 B1 * | 6/2014 | Fletchall | G07G 1/0081 705/16 |
| 8,983,864 B2 * | 3/2015 | Prindle | G06Q 30/0633 705/26.43 |
| 9,330,413 B2 * | 5/2016 | Agarwal | G06Q 30/0633 |
| 2003/0074267 A1 | 4/2003 | Acharya et al. | |
| 2004/0093274 A1 | 5/2004 | Vanska et al. | |
| 2007/0235527 A1 * | 10/2007 | Appleyard | G06Q 10/087 235/383 |
| 2009/0192892 A1 * | 7/2009 | Cason | G06Q 30/0222 705/14.23 |
| 2010/0191578 A1 | 7/2010 | Tran et al. | |
| 2012/0173351 A1 * | 7/2012 | Hanson | G06Q 20/204 705/17 |

(Continued)

OTHER PUBLICATIONS

"U.S. Appl. No. 14/743,812, Final Office Action dated Feb. 9, 2017", 34 pgs.

(Continued)

*Primary Examiner* — Oluseye Iwarere
(74) *Attorney, Agent, or Firm* — Schwegman Lundberg & Woessner, P.A.

(57) ABSTRACT

A system and method of purchasing goods and arranging delivery. The system receives, from a mobile device within a physical store, identifications, made by a customer using the mobile device, of at least two items in the physical store as items to be purchased. The items to be purchased include a first set of items to be delivered and a second set of items not to be delivered. The system receives, from the mobile device, a delivery address for a first set of items. The system receives payment for the first set of items and the second set of items in a single transaction. The system places items corresponding to the first set of items in a delivery pipeline for subsequent physical delivery to the delivery address and authorizes removal of the second set of items from the physical store.

22 Claims, 16 Drawing Sheets

(56) References Cited

U.S. PATENT DOCUMENTS

| | | | |
|---|---|---|---|
| 2013/0030915 A1 | 1/2013 | Statler et al. | |
| 2013/0080289 A1* | 3/2013 | Roy | G06Q 10/10 705/26.8 |
| 2013/0103518 A1 | 4/2013 | Fisher | |
| 2013/0103537 A1* | 4/2013 | Hewett | G06Q 30/0633 705/26.7 |
| 2013/0185150 A1 | 7/2013 | Crum | |
| 2013/0210461 A1 | 8/2013 | Moldavsky et al. | |
| 2013/0211953 A1 | 8/2013 | Abraham et al. | |
| 2013/0282533 A1* | 10/2013 | Foran-Owens | G06Q 30/0641 705/27.1 |
| 2013/0339115 A1* | 12/2013 | Soldate | G06Q 30/06 705/14.23 |
| 2014/0156461 A1 | 6/2014 | Lerner | |
| 2014/0214564 A1* | 7/2014 | Argue | G06Q 30/0633 705/16 |
| 2014/0279191 A1* | 9/2014 | Agarwal | G06Q 30/0633 705/26.7 |
| 2014/0344109 A1* | 11/2014 | Prindle | G06Q 30/0633 705/26.8 |
| 2015/0051994 A1* | 2/2015 | Ward | G06Q 30/0639 705/23 |
| 2015/0088642 A1* | 3/2015 | Mathew | G06Q 30/0633 705/14.51 |
| 2015/0186978 A1* | 7/2015 | Prindle | G06Q 30/0633 705/26.8 |
| 2016/0148238 A1 | 5/2016 | He et al. | |
| 2016/0224955 A1* | 8/2016 | Domeracki | G06Q 20/12 |
| 2016/0247219 A1* | 8/2016 | Sorensen | G06Q 30/0641 |
| 2016/0283925 A1* | 9/2016 | Lavu | G06Q 30/0222 |
| 2016/0371606 A1 | 12/2016 | Schmidt et al. | |
| 2016/0371766 A1 | 12/2016 | Schmidt et al. | |
| 2017/0161728 A1* | 6/2017 | Satyanarayan | G06Q 20/20 |

OTHER PUBLICATIONS

"U.S. Appl. No. 14/743,821, Non Final Office Action dated Jul. 26, 2017", 12 pgs.

"U.S. Appl. No. 14/743,812, Examiner Interview Summary dated Nov. 14, 2016", 3 pgs.

"U.S. Appl. No. 14/743,812, Non Final Office Action dated Aug. 17, 2016", 38 pgs.

"U.S. Appl. No. 14/749,812, Response filed Nov. 16, 2016 to Non Final Office Action dated Aug. 17, 2016", 16 pgs.

MacDonald, Mark, "Introducing Shopify POS", (Aug. 28, 2013), 8 pgs.

MacIver, Kenny, "Fujitsu steps up to the omni-channel retail challenge", [Online]. Retrieved from the Internet: <URL: http://www.i-cio.com/innovation/it-infrastructure/item/fujitsu-steps-up-to-the-omni-channel-retail-challenge>, (Jan. 2014), 3 pgs.

Mohr, Carolyn Nicander, "Clutch Shopping—A Cornucopia of Shopping Apps in One", [Online]. Retrieved from the Internet: <URL: http://www.wonderoftech.com/clutch-shopping-app/?print=1&id=12522&custom_key=Print_Button>, (Dec. 21, 2012), 3 pgs.

O'Callaghan, Oisin, "Fujitsu's Revolutionary Global Omni-Channel Retailing Solution Now Available in Ireland", [Online]. Retrieved from the Internet: <URL: http://www.fujitsu.com/ie/news/pr/2014/fs-20141001.html>, (Oct. 1, 2014), 3 pgs.

"U.S. Appl. No. 14/743,821, Examiner Interview Summary dated Oct. 25, 2017", 3 pgs.

"U.S. Appl. No. 14/743,821, Final Office Action dated Dec. 14, 2017", 10 pgs.

"U.S. Appl. No. 14/743,821, Response filed Oct. 20, 2017 to Non Final Office Action dated Jul. 26, 2017", 14 pgs.

* cited by examiner

CUSTOMER CONTROLLED HOME DELIVERY

TECHNICAL FIELD

This document generally relates to methods and systems for a hybrid online and in-store, mobile device application assisted, shopping.

BACKGROUND

Online stores have co-existed with physical (so called "bricks and mortar") stores for many years. There have been previous attempts to integrate the online shopping experience with bricks and mortar shopping. For example, some stores allow shoppers to make purchases online for later pickup at a physical location. Some stores allow shoppers to search their online sites for nearby locations at which a particular item is available for purchase. Some stores even allow customers to filter a search of an online site based on the availability of the items at a particular physical location.

However, despite these previous attempts, the integration of online and bricks and mortar stores has never been seamless. In the prior art, a customer making an online purchase for later pickup must make a specific effort to perform both the purchasing and the picking up of the item, with little benefit that could not be gained by merely going to the physical store and buying the item there. The online databases of product availability are often inaccurate, saying that an item is present when it is either out of stock (e.g., due to inaccurate inventories, theft, and the like) or misplaced within the store. The customer has no convenient way of determining the accuracy of the information without going to the store or calling the store and hoping that the store employees will be willing to do a physical search.

BRIEF DESCRIPTION OF THE DRAWINGS

Some embodiments are illustrated by way of example and not limitation in the figures of the accompanying drawings in which.

DETAILED DESCRIPTION

Some embodiments provide an integrated system for shopping online and in physical stores. The system provides a virtual shopping cart for online shopping. The virtual shopping cart includes a listing of items selected from one or more online stores. In some example embodiments, the virtual shopping cart is accessible through a mobile device. The data in the virtual shopping cart may be stored on the mobile device. In other example embodiments, the data in the virtual shopping cart is stored elsewhere, but is accessible through the mobile device over one or more networks (e.g., 802.11 based networks, cellular data networks, other wireless or wired networks, and the like). The system may activate a set of physical store-related functions (sometimes referred to as "in-store functions") when the mobile device enters the proximity of a physical store with devices configured to interface with the system.

In some example embodiments, the in-store functions include displaying a shopping list of items that are both in the virtual shopping cart and within the physical store's inventory. Various embodiments provide controls to receive various different customer responses to the shopping list. In some example embodiments, the in-store functions allow a customer to select all of the items on the shopping list and/or a sub-set of the items on the shopping list. The customer can then designate the selected items for purchase at the physical store.

The system may include a detailed map of the store including the locations of specific items in the store. The system may determine an optimum route for the customer to collect all of the selected items (e.g., by determining which item is the shortest walk from the customer's present location, which of the remaining items is the shortest walk from that item, and the like).

Some example embodiments provide an integrated application for online and in-store shopping. The application may run on a mobile device and/or other computing devices.

Figure 1:
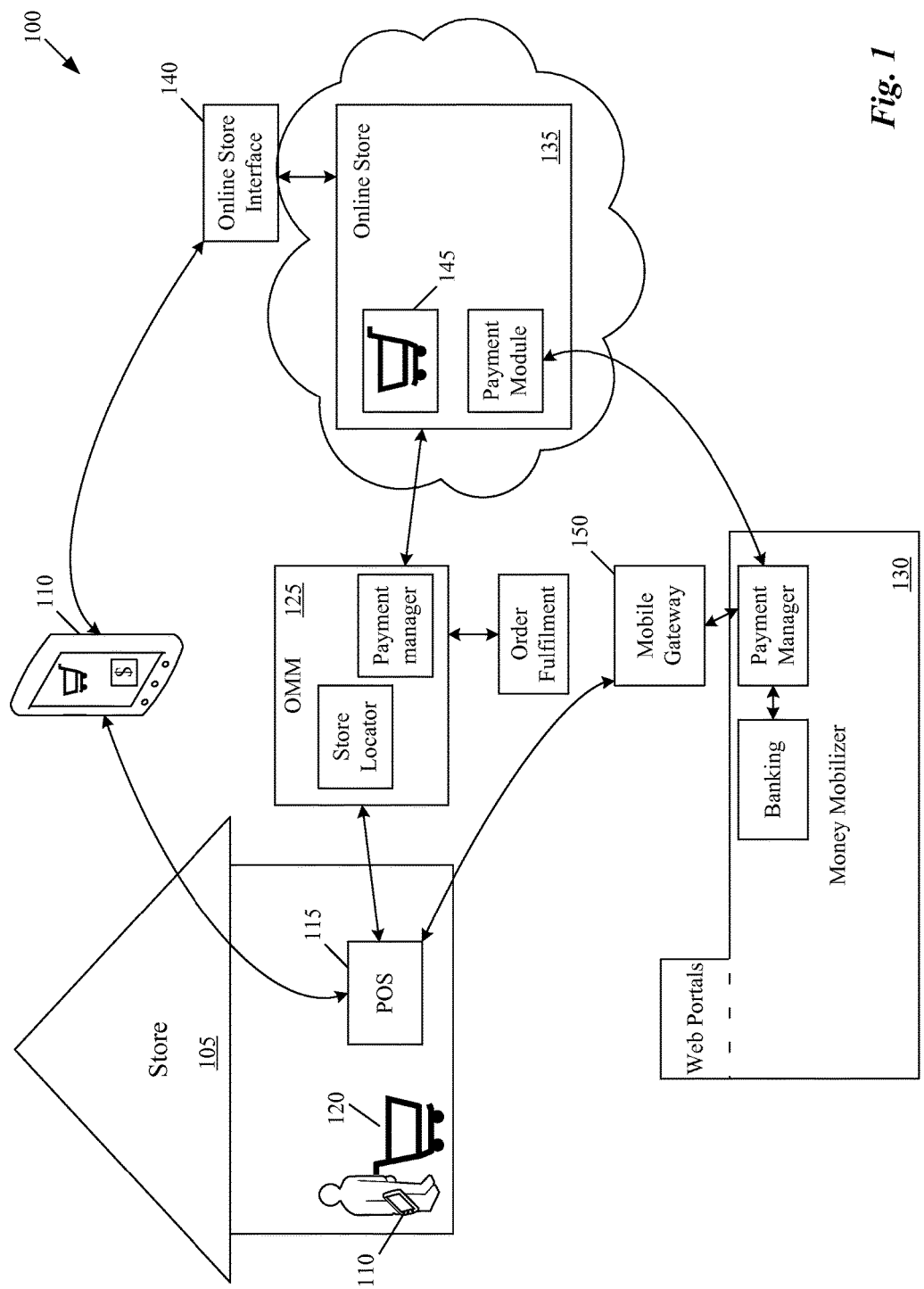
FIG. 1 illustrates a system, in accordance with an example embodiment, to integrate online and in-store shopping.

FIG. 1 illustrates a system 100, in accordance with an example embodiment, to integrate online and in-store shopping. The system 100 includes a store 105, a user of a mobile device 110, a point of sale interface 115, a physical shopping cart 120, an order management module (OMM) 125, a money mobilizer system 130, and an online store 135. The online store 135 is shown to include an online store interface 140 and a virtual shopping cart 145.

The mobile device 110 includes several hardware and/or software based features. A customer may use the mobile device 110 that implements the integrated application to scan items when adding the items to the shopping cart 120. In some example embodiments, the customer can use the integrated application on the mobile device 110 to send a list of the scanned items to the point of sale interface 115 and to pay at the point of sale interface 115.

In an example embodiment, the mobile device 110 is capable of connecting with the Internet through one or more interfaces. The mobile device is capable of identifying items using one or more of 1) visible light scanning (e.g., using an image capture system to scan bar codes, Quick Response (QR) codes, and the like); 2) radio frequency scanning (e.g., using Radio-frequency identification (RFID) systems, Bluetooth, Wi-Fi, and the like); and 3) receiving user input (e.g., using auditory input, interface devices, touchscreens, and the like). The mobile device 110 is shown as physically within the store 105. However, the same device is also shown between the store 105 and the online store 135 to illustrate connectivity of components of the integrated shopping system. In some embodiments, a mobile device with the integrated shopping application is able to perform some functions exclusively within the store (e.g., interfacing with the point of sale). The mobile device is also able to perform some functions (e.g., online shopping) anywhere that connectivity to a network (e.g., the Internet) is available.

The point of sale interface 115 is an electronic system that interfaces with the mobile device 110 while the mobile device 110 is present within the store 105. The point of sale interface 115 may be implemented using one or more of low power Bluetooth radio frequency signals, Wi-Fi signals, or other local signals from one or more devices in the store to communicate directly with the mobile device 110. However, in other embodiments, the point of sale is implemented virtually. For example, the point of sale 115 may be implemented by hardware that is not physically located in the store, such as a server located outside the store that is programmed to act as a point of sale for the store 105 when the mobile device 110 is present within the store 105. In some embodiments, a single server may act as a point of sale for multiple physical stores. Similarly, the radio frequency devices used to communicate with the mobile device 110 may be located outside the physical store 105. The physical shopping cart 120 is any movable container for a user of the mobile device 110 to place items into after scanning the items with the mobile device 110.

When the integrated application is used for a purchase at a point of sale 115, the OMM 125 determines the location of the store 105 and, for some transactions (e.g., transactions involving deliveries), coordinates any order fulfilment operations required by the transaction. Similarly, when the integrated application is used for a purchase at an online store, the OMM 125 coordinates order fulfilment. In some embodiments, the OMM 125 includes a payment manager to handle internal (e.g., accounting) and/or external (banking) aspects of transactions.

The money mobilizer system 130 provides an interface for payment for the items purchased in the physical store 105 or the online store 135. The point of sale 115 may communicate with the money mobilizer system 130 through a mobile gateway 150 to implement a payment method. The mobile gateway 150 may support any or all of smartphones, wearable mobile devices, and any other mobile devices. After the money mobilizer system 130 communicates back to the point of sale interface 115, the point of sale interface 115 may communicate back to the integrated application on the mobile device 110 to indicate whether the payment was successful.

In an example embodiment, the integrated application can interface with an online store 135 through an online store interface 140. In some embodiments, the user can select items in the online store and save a list of the items in the virtual shopping cart 145. The user can then purchase the items in the virtual shopping cart for delivery or later pickup at a physical store. In addition to the standard methods of receiving items from online shopping, in some embodiments, when a mobile device 110 enters the physical store 105, the integrated application identifies items in the virtual shopping cart 145 that are also present in the physical store 105. The integrated application's actions when items from the virtual shopping cart 145 are present in the store 105 are further described in the following section.

Although many of the embodiments described herein are described with respect to an online store and a physical store, one of ordinary skill in the art will understand that other embodiments encompass multiple online stores and/or multiple physical stores. For example, in some embodiments, a virtual shopping cart may be shared by multiple online stores. In other embodiments, the application may identify items in a physical store that are from multiple virtual shopping carts from multiple online stores. Similarly, in some embodiments, one or more virtual shopping carts will be evaluated at more than one physical store. The multiple physical stores may be multiple physical locations of a single type of store (e.g., stores owned by, or franchises of, a particular company or family of companies). Alternatively, the multiple physical stores may be multiple stores that participate in the integrated shopping experience but are not otherwise related.

Some embodiments provide an integrated system for shopping online and in physical stores. The system provides a virtual shopping cart associated with a particular account (e.g., an account belonging to a particular user or group of users) for online shopping. The virtual shopping cart includes a listing of items selected from one or more online stores. The virtual shopping cart may be accessible through a mobile device. The data in the virtual shopping cart may be stored on the mobile device. Alternatively, the data in the virtual shopping cart may be stored elsewhere, but may be accessible through the mobile device over one or more networks (e.g., 802.11 based networks, cellular data networks, other wireless or wired networks, and the like). The system of an example embodiment activates a set of physical store related functions (sometimes referred to as "in-store functions") when the mobile device enters the proximity of a physical store with devices configured to interface with the system.

The in-store functions may include displaying a shopping list of items that are both in the virtual shopping cart and within the physical store's inventory. Various embodiments provide controls to receive various different customer responses to the shopping list. In some embodiments, the in-store functions allow a customer to select all of the items on the shopping list and/or a sub-set of the items on the shopping list. The customer can then designate the selected items for purchase at the physical store.

The system may include a detailed map of the store, possibly including the locations of specific items in the store. In some such embodiments, the system determines an optimum route for the customer to collect all of the selected items (e.g., by determining which item is the shortest walk from the customer's present location, which of the remaining items is the shortest walk from that item, and the like).

Figure 2:
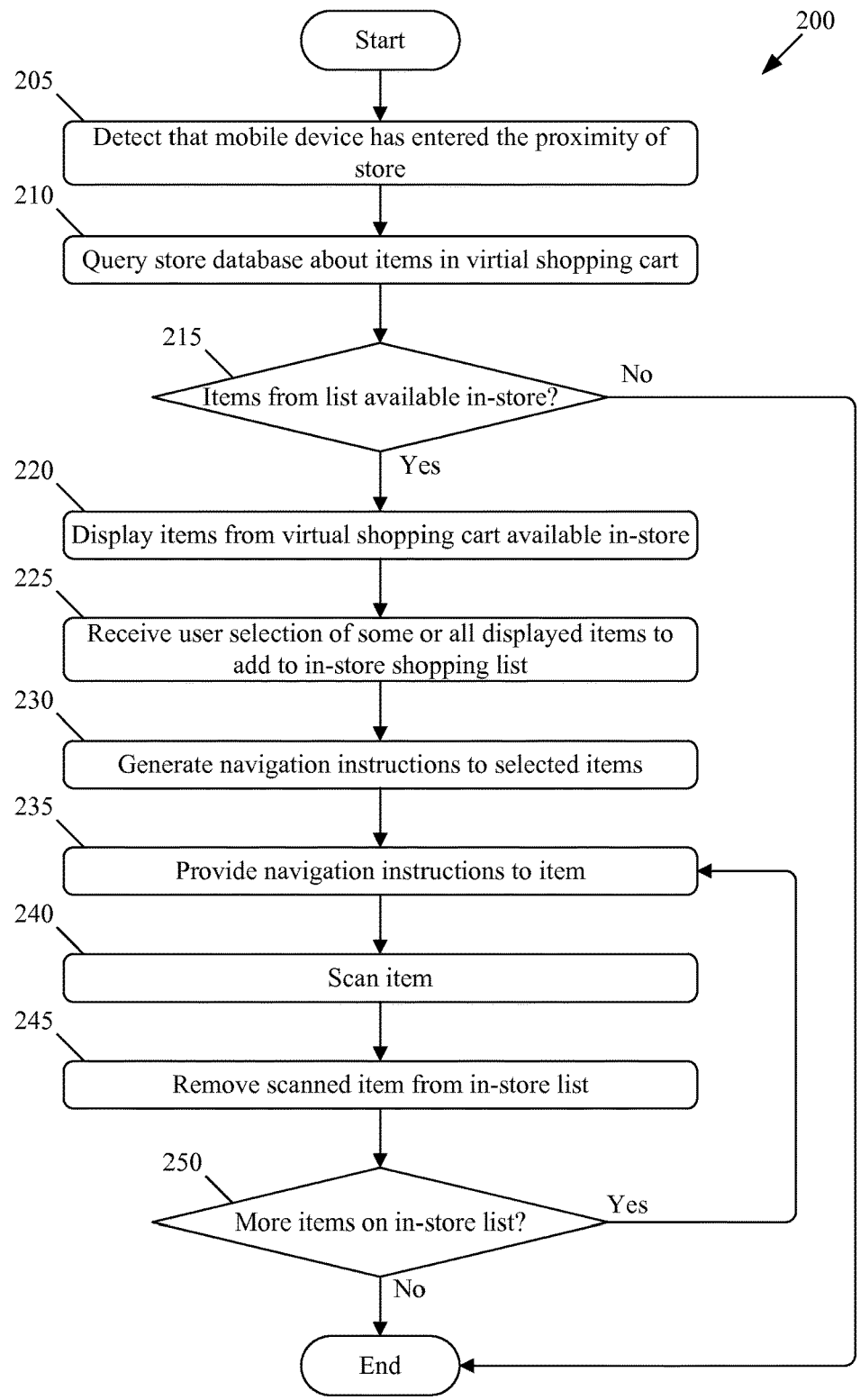
FIG. 2 conceptually illustrates a method, in accordance with an example embodiment, for integrating online and in-store shopping using a mobile device.

FIG. 2 conceptually illustrates a method, in accordance with an example embodiment, for integrating online and in-store shopping using a mobile device. The method 200 of this example embodiment begins by detecting (at 205) that the mobile device has entered the proximity of a participating store. The mobile device itself may determine that it has entered the proximity of the participating store. Alternatively, a system external to the mobile device determines that the mobile device has entered proximity to the store. Various embodiments use various different means to make this determination. The mobile device may determine this by detecting signals from low powered transmitters of an indoor positioning system. Some such indoor positioning systems use the Bluetooth Low Energy system (e.g., the iBeacon system). However, other embodiments determine proximity with other low powered transmission systems and devices. In other embodiments, the mobile device determines proximity to a participating store using other systems such as a Global Positioning System (GPS) system to identify the physical position of the mobile device and a database of participating store locations to determine that the location is in proximity to a store location. Proximity to the store may include the entire interior of the physical boundaries of the store. Proximity to the store may include locations outside the physical boundaries of the store. Proximity to the store may exclude some locations in the store (e.g., "dead" zones within the store).

The method 200 then queries (at 210) a database of items in the physical store to identify items that are both in the physical store and in a virtual shopping cart of the mobile device. The mobile device may access the database through an Internet based system (e.g., through a Wi-Fi or cellular data network). Alternatively, access to the database may be provided to the mobile device over a local wireless connection such as a Bluetooth connection.

The method 200 determines (at 215) whether there are any items from the virtual shopping cart available in the store. In some embodiments, the method only displays items when the exact item from the virtual shopping cart is available in the store (e.g., the exact brand and quantity, such as Acme Brand 2% Milk, ½ gallon in virtual shopping cart and Acme Brand 2% Milk, ½ gallon in the store). In other embodiments, the method displays items based on a partial match (e.g., Acme Brand 2% Milk, ½ gallon in virtual shopping cart, and Beta Brand 2% Milk, ½ gallon in the store). The app on the mobile device or an online interface of the system accessed from a non-mobile computer may provide a setting to allow the customer to determine whether the integrated system should offer close substitutes. The system may offer finer controls that allow the customer to determine whether close substitutes should be offered on an item by item basis. For example, a customer could specify that similar products should be offered in place of a particular brand (or selected item) of milk, but not in place of a particular brand (or selected item) of bread.

If there are no items from the virtual shopping cart available in the store (and no allowable substitutes), then the method 200 ends. If there are items from the virtual shopping cart available in the store, the method 200 displays (at 220) those items (and/or allowable substitutes) on the mobile device. The method then provides options to allow the customer to select the items and receives (at 225) the customer's selection of some or all of the displayed items to add to an in-store shopping list.

The method of some embodiments then generates (at 230) navigation instructions to the selected items. The navigation instructions may be generated in a sequence that optimizes the walking distance to each of the items. For example, the navigation instructions may be generated as a set of directions to the closest item (in terms of walking distance) to the mobile device, followed by a set of directions to the closest of the remaining items to the first item, and so on, until all items on the in-store list have been accounted for.

The method then provides (at 235) navigation instructions, on the mobile device, to the first item. When the customer reaches the first item, the customer presents the item to the mobile device. The method then scans (at 240) the item. Once the item has been scanned, the method removes (at 245) the item from the in-store list. The customer may then place the item in a physical shopping cart to transport it around the store while collecting the other items on the in-store list. In some embodiments, when removing the item from the in-store list, the method places the item on a list of scanned items to be purchased. The list of scanned items may identify (for the store) what items the customer is purchasing, saving the time and effort of scanning the items at a checkout line. Alternatively, the store may scan the items at checkout time as well as, or instead of the customer scanning the items as they are added to the physical shopping cart. Some stores may require scanning at checkout to avoid errors, such as when the customer changes his or her mind about an item and places it back on the shelf without informing the mobile device.

Once the scanned item is removed from the in-store list, the method determines (at 250) whether there are more items on the in-store list. When there are more items, the method returns to operation 235 and provides navigation directions to the next item on the list. When there are no more items on the in-store list, the method 200 ends.

Figure 3:
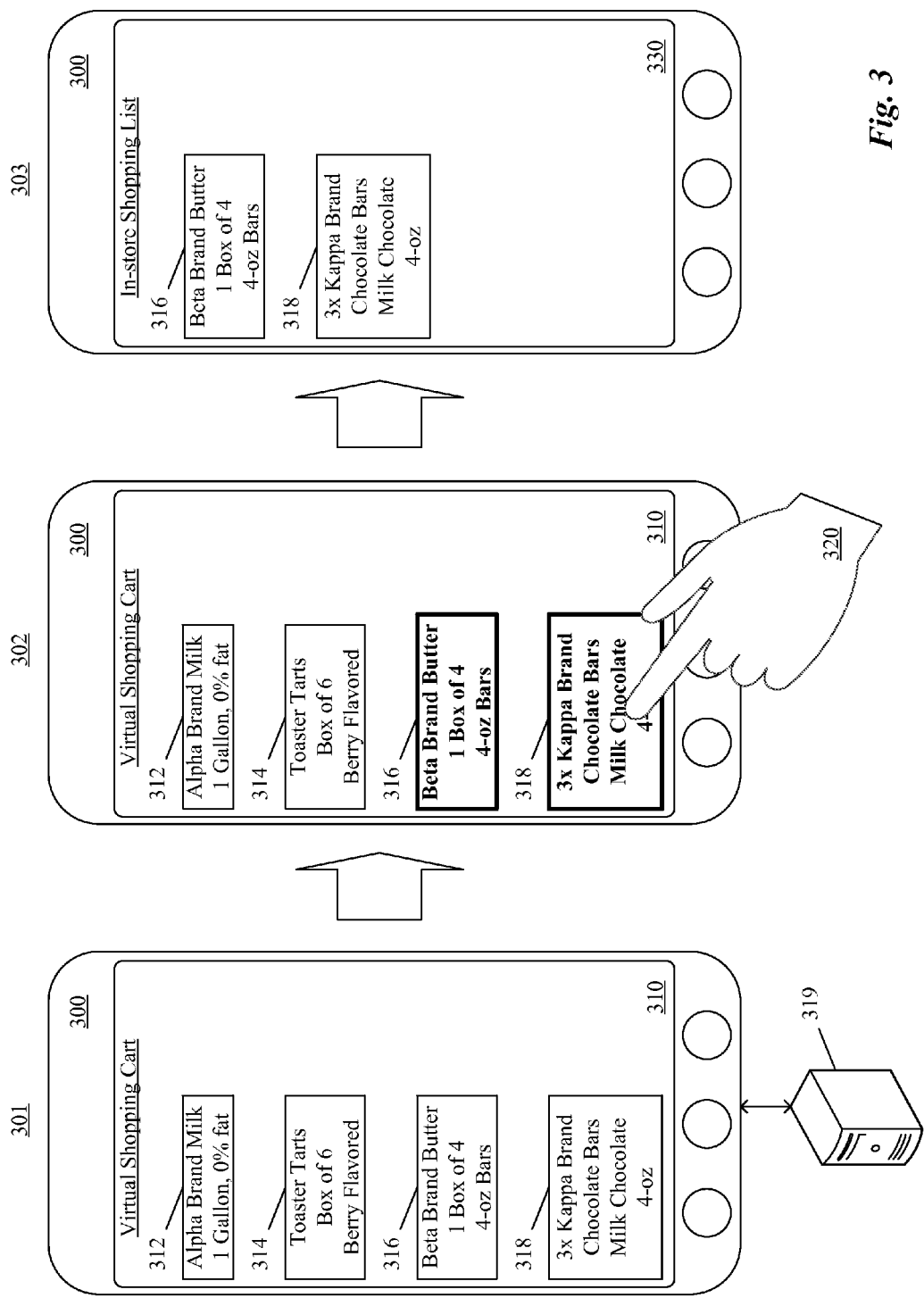
FIG. 3 conceptually illustrates integration of online virtual shopping carts and in-store shopping carts, in accordance with an example embodiment.

FIG. 3 conceptually illustrates integration of online virtual shopping carts and in-store shopping carts, in accordance with an example embodiment. In the embodiment of FIG. 3, the system transfers an item from the virtual shopping cart to a customer's in-store shopping list when the item in the store matches the item in the virtual shopping cart exactly (e.g., the same quantity, the same brand, the same characteristics, in some cases, the same bar-code number). The figure is shown in three stages 301-303. In stage 301, the customer enters a physical store that implements the integrated system. When the customer enters the store, the customer has a mobile device 300 with access to a virtual shopping cart 310 filled with items including milk 312, toaster tarts 314, butter 316, and three chocolate bars 318. The system may store the shopping list on the mobile device 300. Alternatively, the mobile device 300 may access a shopping list stored on a server. The system may allow the customer to place the items in the virtual cart by various shopping options. These options may include one or more of the following: 1) selecting an item in an online store; 2) selecting an advertisement that causes the item to be added; and 3) scanning an item (e.g., the bar code of an item, an image of the item, and the like) in a physical store with an activation of an option to add the item to shopping cart rather than purchase the item in-store at that time.

The mobile device 300 of this example embodiment sends the list of items in the virtual shopping cart 310 to an external server 319 (e.g., external to the mobile device) at the store or at a different physical location. The external server 319 has access to a database of items present in the physical store's physical inventory. In such embodiments, the external server 319 matches the items in the virtual shopping cart 310 to items in the store. The external server 319 then sends a list of the matching items to the mobile device 300. In other embodiments, the mobile device 300 receives a list of items in the store's database of physical inventory, and the mobile device 300 compares the items in the database to the items in the shopping cart. Each of these embodiments has advantages and disadvantages over the other. The server evaluation method requires far less data to be transferred between the mobile device 300 and the server 319 (the number of items in a customer's virtual shopping cart 310 will generally be shorter than the list of different items in the physical store). Additionally, if the server 319 evaluates the items, a competitor trying to do illicit market research (e.g., by downloading the store's inventory database with a hacked application) will have a harder time identifying the entire inventory of the store. One advantage to the mobile method is that it protects the customer's privacy about items that are in their virtual shopping cart unless the items are present in the store.

In stage 302, the system has compared the items in the virtual shopping cart 310 to the items in the store and identified the items from the shopping cart that are present in the store. In the illustrated example, the butter 316 and chocolate bars 318 are present in the store, as indicated by the text changing to bold and the text boxes being emphasized. Although this embodiment uses a particular set of visual indicators to identify available items, one of ordinary skill in the art will understand that other embodiments use other indicators (e.g., any combination of different colors, enlarged text, removing or de-emphasizing unavailable items, or any other means of distinguishing one set of items from another). In stage 302, the customer selects the available items that he wants to pick up in the store. In the illustrated embodiment, the customer selects the items by touching a touch-sensitive screen of the mobile device 300 with a hand 320. In the illustrated embodiment, the in-store shopping list 330 is opt-in. That is, only the selected items will be added to the in-store shopping list 330. The system may provide an option that allows the customer to select how many items of a particular type to add to the in-store shopping list. For example, the customer may choose an "add number from virtual shopping cart" option with respect to the chocolate bars 318 to add all three chocolate bars to the in-store shopping list 330. The customer could also choose an "add X number" option to transfer a particular number of chocolate bars 318 to the in-store shopping list, leaving the rest in the virtual shopping cart. In some embodiments, the customer can select multiple items of the same type by repeatedly tapping the listed available item in the virtual shopping cart 310. However, in other embodiments, the list may be opt-out. That is, all items from matching list 330 are added to the in-store shopping list 332, unless removed from the list by the customer.

In stage 303, the mobile device 300 displays an in-store shopping list 330 of items transferred from the virtual shopping cart 310 after the customer selects them. In some embodiments, the customer is then left to find the items on their own. In other embodiments, the system gives the customer directions to the items on the in-store shopping list 330. The uncollected items may be displayed on the mobile device as points on a map of the store; the items may be provided on a list of aisle numbers and locations along aisles; or other methods may be used to direct the customer to the items (e.g., arrows on the mobile device, a heads up display on a wearable mobile device such as Google Glass™, Pebble™ smartwatch, and the like).

Figure 4:
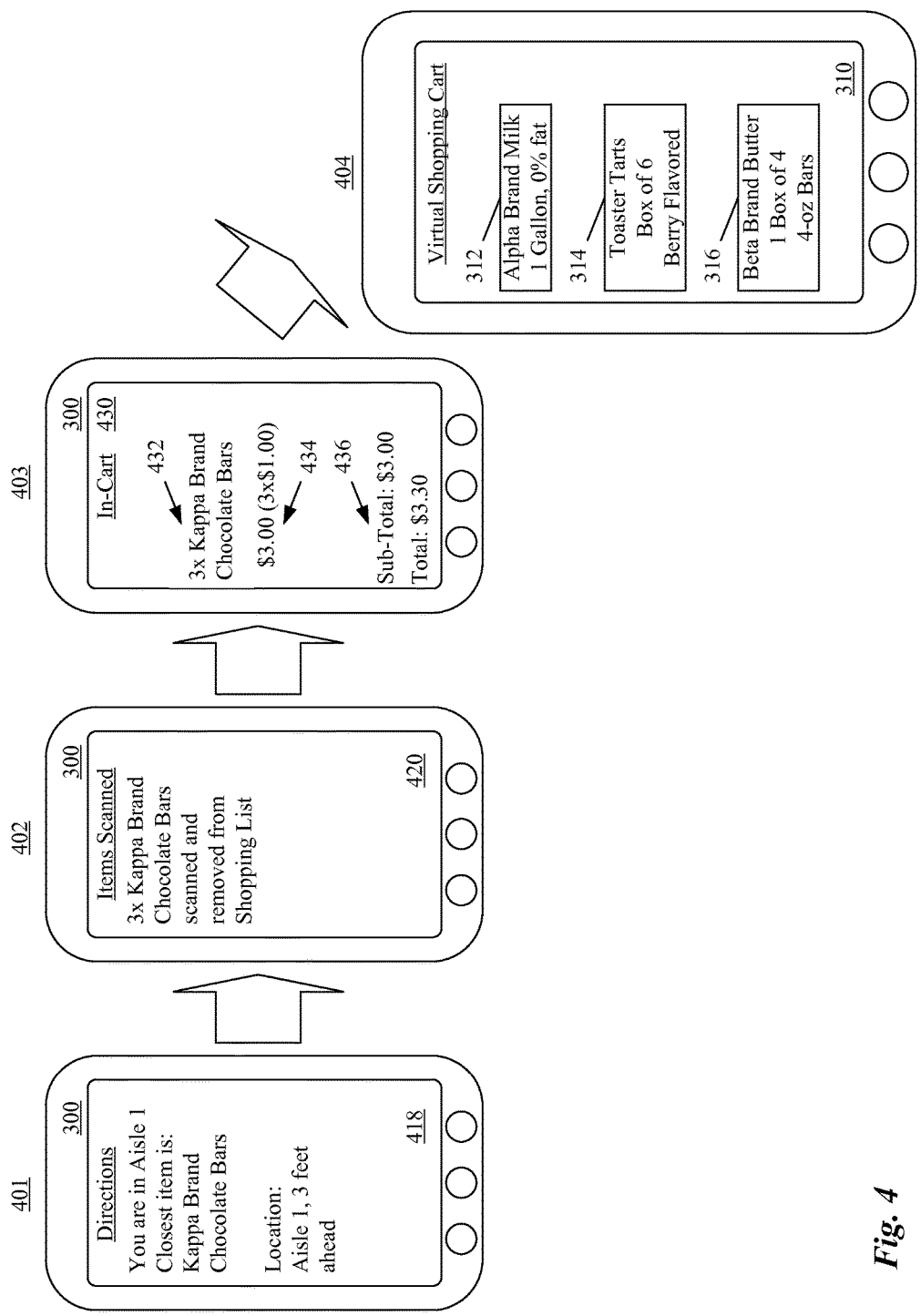
FIG. 4 illustrates the operations of a mobile device as the customer shops physically.

FIG. 4 illustrates the operations of a mobile device as the customer shops physically. The figure continues with the example items shown in FIG. 3. In stage 401, the figure illustrates the provision of directions to the items as the mobile device directs the customer to the first item on the list. Here, the customer is directed to the physical chocolate bars first with direction 418. The list of items to collect may be provided in order of proximity from the nearest item (e.g., in actual distance or in terms of walking distance) to the farthest item, on the in-store shopping list 330 of FIG. 3.

Alternatively, a path minimization algorithm may be used to identify a relatively short (or optimum) path to each item on the list. The directions may be provided in an order that takes other characteristics of the items into account. For example, the system may distinguish items by refrigeration needs, sending the customer first to items that do not need refrigeration, then to items that need to be kept refrigerated, then to items that need to be kept frozen. Such a system prevents the melting/warming up of frozen/refrigerated items while the customer shops for items that do not need to be kept as cold. Alternatively, the system may direct a customer to items in the order the customer selects them on the list.

In stage 402, the customer scans items, here the physical chocolate bars identified in message 420, with the mobile device 300, and puts them in the physical shopping cart (not shown). The mobile device 300 may scan the items using a visual identification system (e.g., bar codes, QR codes, image recognition, and the like), by some other system such as RFID, or using some other method. The items are then removed from the in-store shopping list. The items may be added to a different list, referred to herein as the "in-cart" list 430 as shown in stage 403. In this embodiment, the in-cart list 430 includes item identifier 432, price 434, and price totals 436. However, one of ordinary skill in the art will understand that in other embodiments, other information is provided in the in-cart list.

In some embodiments, the in-cart list 430 is maintained to determine what to charge when the customer is ready to check out. In other embodiments, the in-cart list 430 is maintained in case the customer decides while shopping to purchase more or fewer of the collected items. The system may allow the customer to view the in-cart list 430. When the customer selects an item on the in-cart list 430, the system offers the customer options for one or more actions. The system may provide an option so that the customer can request to be directed back to the location of the selected item. The system may allow the customer to remove items from the in-cart list 430 when putting the items back on the shelf (e.g., when the customer changes his mind about buying an item after scanning it and putting it in the cart). In some example embodiments, items removed from the in-cart list 430 are not put back on another list. In other example embodiments, items removed from the in-cart list 430 are added back to the virtual shopping cart 310 of FIG. 3. Alternatively, the system may allow the customer to choose whether to add the item back to the virtual shopping cart 310 or delete it entirely when removing it from the in-cart list 430.

In stage 404, the customer has purchased their items and left the store. In the illustrated embodiment, any unpurchased items from the in-store shopping list 330 of FIG. 3 are automatically returned to the virtual shopping cart 310. Here, the customer did not purchase the butter 316. Accordingly, this item has been returned to the virtual shopping cart 310. The customer can then optionally go to another store, order the items online, decide not to purchase the item, or take some other action. The above described embodiments remove items from the virtual shopping cart 310 when the items are added to the in-store shopping list 330 of FIG. 3. However, in some embodiments, items remain in the virtual shopping cart 310 until the customer purchases the items. In such embodiments, the items are removed from the virtual shopping cart 310 after the customer purchases them.

Figure 5:
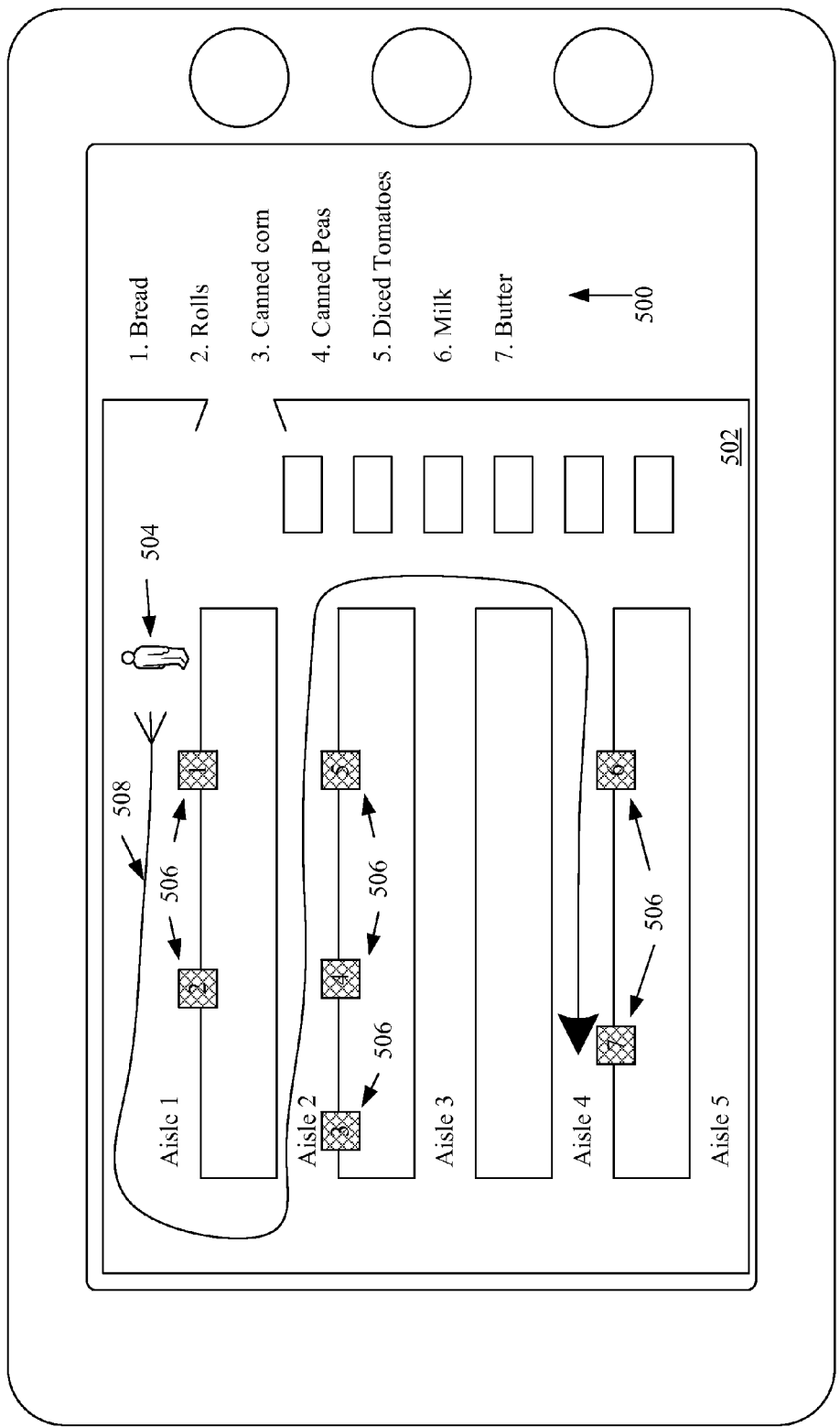
FIG. 5 illustrates an example embodiment of a graphical user interface that displays items from an in-store shopping list on a map.

The mobile device may provide a map to the items on an in-store shopping list. FIG. 5 illustrates an example embodiment of a graphical user interface that displays items from an in-store shopping list on a map. The map 502 includes a location indicator 504 that identifies the current location of the customer (e.g., based on the location of the mobile device as determined by an iBeacon system, GPS, or other method of determining location). The item location indicators 506 identify the locations of the specific items on the shopping list. This example embodiment also provides a route 508 for the customer to walk through the store to pick up the items.

Different embodiments treat the item indicators 506 differently as the customer scans items and puts them in his shopping cart. In some embodiments, the indicators 506 are progressively removed as the customer collects the items. In other embodiments, the indicators remain, but are visibly altered to differentiate between collected items and uncollected items. For example, in some embodiments, indicators 506 representing collected items are shown in a first color (e.g., green) or pattern and indicators 506 representing uncollected items are shown in a second color (e.g., red) or pattern. Similarly, some embodiments represent the closest item with a visually different indicator, such as a third color, changing size, pattern, and the like.

In the above described embodiments, an item was transferred from a virtual shopping cart to an in-store shopping list whenever the item in the store exactly matched the item in the virtual shopping cart. However, in other embodiments, the transfer of items from a virtual shopping cart to an in-store shopping list is performed conditionally. The customer may have particular requirements in mind for transferring items. For example, in some cases, the prices may not be identical between the customer's selected online source of items and the physical store's items. Accordingly, the customer may want to transfer items that are cheaper or equally priced in the physical store, but not transfer items that are more expensive in the physical store. The system may take shipping costs into account when determining which items are cheaper or equally priced in the physical store or the online store. In some cases, a customer may have a preference for online shopping or a preference for physical shopping. Such a customer might be willing to shop by the less preferred method when the savings received by using the less preferred method exceed a particular threshold. Accordingly, some embodiments allow a customer to choose an option which transfers items unless the online price is less (or more) than the in-store price by a particular percentage. For example, a customer who prefers to shop in a physical store may set the system to transfer items unless the online price is less than 80% of the in-store price. That is, the customer is willing to pay extra to buy the item in a physical store, but not if the online discount is better than 20%. Similarly, a customer who prefers to shop online may set the system to transfer items only if the online price is more than 115% of the in-store price. That customer is willing to pay extra to buy the item online, but not if they have to pay more than 15% extra.

The system may provide the customer with options to select other conditions. For example, the optional conditions may include proximity to a particular address, reputation rating of the physical store, or any other condition relating to the item, other items in the virtual shopping cart, other items in the physical store, characteristics of the online store, shipping conditions (e.g., transfer if shipping would take more than a particular amount of time, cost more than a particular amount, and the like).

In online shopping, the retailers often have an enormous and varied inventory with multiple items of the same general type (e.g., flash drives from 10 different manufacturers and in 40 different styles). The customers of online stores generally choose the precise item that they want from a large selection of different options. From the products that the online seller has available, the customer chooses the brand, size, model, and other characteristics of the item they want, and then, if the price is acceptable to them, they put the item in their shopping cart and buy it. The online retailer then ships them that exact brand, size, model, and the like. of item. Usually, even in cases where the retailer offers a substitute item when the ordered item is not available, the retailer consults the customer before sending the substitute item. There may be some online retailers that provide items that are less precisely identified (e.g., items offered by general type, without specifying brands, models, or specific item identifiers). However, in most online retailing, the customer expects to receive exactly what they order.

In-store shopping is often less precise. Customers often want items with certain general characteristics, but with the limited physical inventory of a store, the customer may be willing to settle for a near match. For example, a customer who puts Acme brand milk in their virtual shopping cart may not care whether they buy Acme brand milk or Beta brand milk as long as the characteristics of the milk (e.g., volume and fat content) are correct. Accordingly, the system of may provide a customer with an option to have the system offer a near match to an item in the virtual shopping cart when an exact match is not available. The system may provide an option to receive such offers when the brand is different, but all other relevant characteristics of the item are the same. The systems of some embodiments allow more detailed criteria. For example, some systems allow a customer to select some (zero or more) characteristics of an item in the shopping cart as necessary characteristics and set other (zero or more) characteristics as optional characteristics. For example, a customer may add one gallon of 1% fat Acme brand milk to the virtual shopping cart. The system may allow a customer to set the brand as optional and the volume and fat content as required. In this example, the customer can select options such that the offered item must be one gallon of milk and the offered item must be 1% fat, but the offered item is not required to be Acme brand. Similarly, the system may allow the customer to set the size as optional, but the brand and fat content as necessary requirements. In this example, the customer may be willing to accept a smaller or larger amount of milk as long as it is 1% fat and Acme brand milk. The system may offer more options than "necessary" or "unnecessary." For example, the system may offer options for at least some characteristics of the item that allow small variations, but not larger ones; for example, when the selected item is a one pound package and the customer has set an option that the weights of offered items should be "close" to the weight of the selected items, the system will offer a ¾ pound package when the one pound package is not available, or possibly even ½ pound package. The system may offer only the closest available option or it may offer every available option within a certain range of the selected characteristic.

Figure 6:
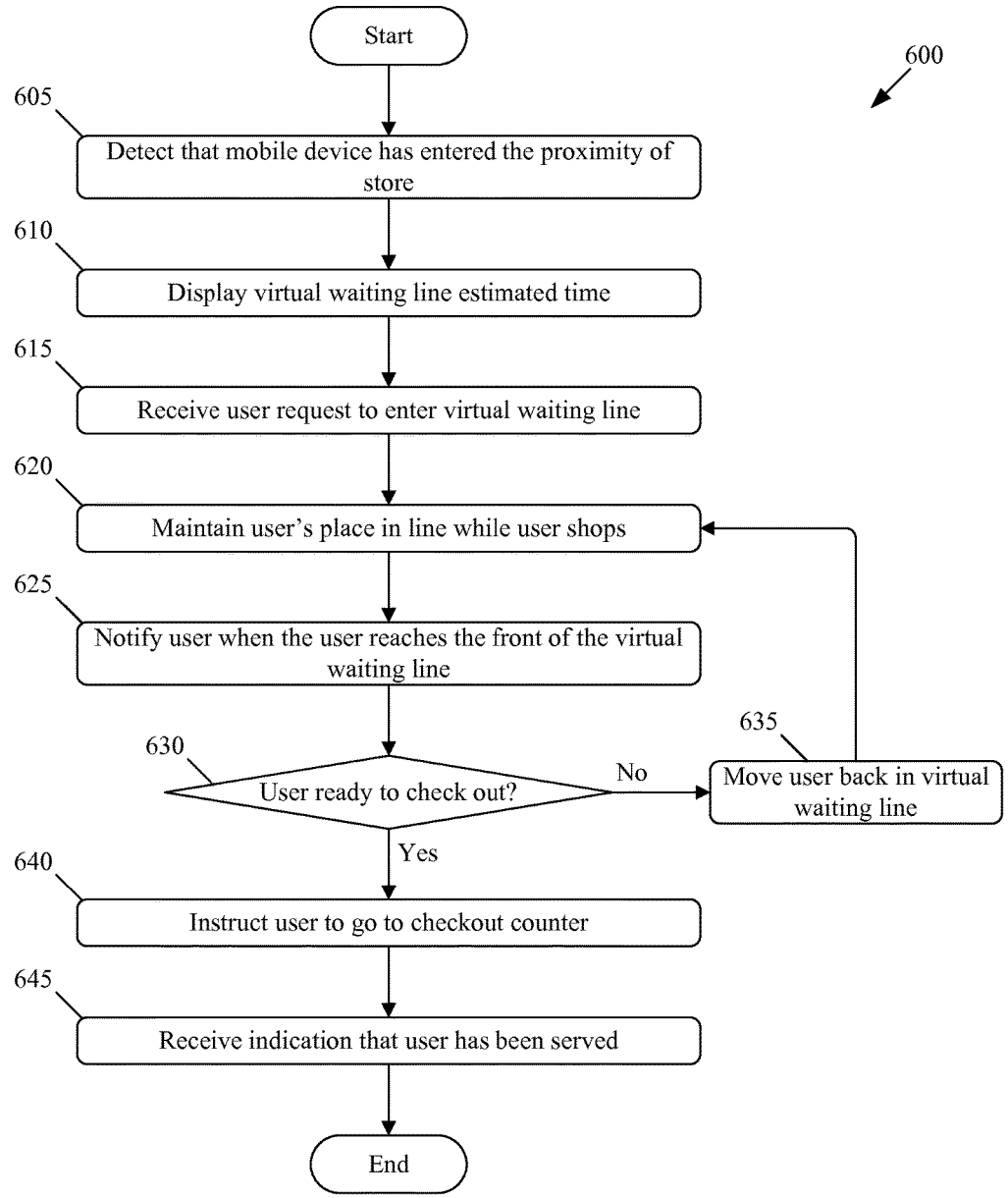
FIG. 6 conceptually illustrates a method for providing virtual waiting lines for customers with mobile devices configured to implement the integrated shopping system.

FIG. 6 conceptually illustrates a method 600 for providing virtual waiting lines for customers with mobile devices configured to implement the integrated shopping system. The method 600 of some embodiments detects (at 605) that the mobile device has entered the proximity of a participating store. Various embodiments use the various technologies described above with respect to the method 200 of FIG. 2 to detect that the mobile device has entered proximity of the store. The method 600 then displays (at 610) a virtual waiting line estimated time. The method then receives (at 615) a customer request to enter the virtual waiting line. The method then maintains (at 620) the customer's place in line while the customer shops. The customer approaches the front of the virtual waiting line as other customers reach the front of the line and check out. In addition to, or instead of providing an employee at the point of sale, retailers implementing the system can provide a self-checkout option at the end of the virtual waiting line. Such a point of sale can be integrated with a self-service terminal provided in the self-checkout areas where one or more customers check out simultaneously.

The method 600 notifies (at 625) the customer when the customer reaches the front of the virtual waiting line. The method determines (at 630) whether the customer is ready to check out at that time. The mobile device may determine directly whether the customer is ready to check out by receiving an indication from the customer (e.g., by receiving a customer activation of a "ready to check out" control on the mobile device or a "not ready to check out" control). Alternatively, the mobile device may determine indirectly whether the customer is ready to check out (e.g., by determining whether the customer is within a certain range of the checkout station(s) used by customers in the virtual line). The method may also make the determination based on negative evidence. For example, when the customer is far from the checkout area at that time, or does not activate a control to indicate that the customer is ready, the system will assume that the customer is not ready.

In some cases, the customer is not ready to check out when he or she reaches the front of the virtual waiting line. If the method determines (at 630) that the customer is not ready to check out, the method moves (at 635) the customer back in the virtual waiting line. The method may move the customer to the back of the virtual waiting line. Alternatively, the method may move the customer backwards, but not all the way to the back of the line. If the customer is ready to check out, the method instructs (at 640) the customer to go to the checkout area. The method may provide the instruction on the mobile device. The method may provide the instruction on an in-store display, such as a fixed video display or a display integrated with the physical shopping cart (e.g., identifying the next customer by name or username based on information provided by the mobile device) in addition to or instead of providing the instruction on the mobile device. After the method receives (at 645) an indication that the customer has been served (e.g., an indication by the customer activating a control on the mobile device, or an indication by an interaction with the mobile device and the point of sale or checkout station), the method 600 ends.

Figure 7:
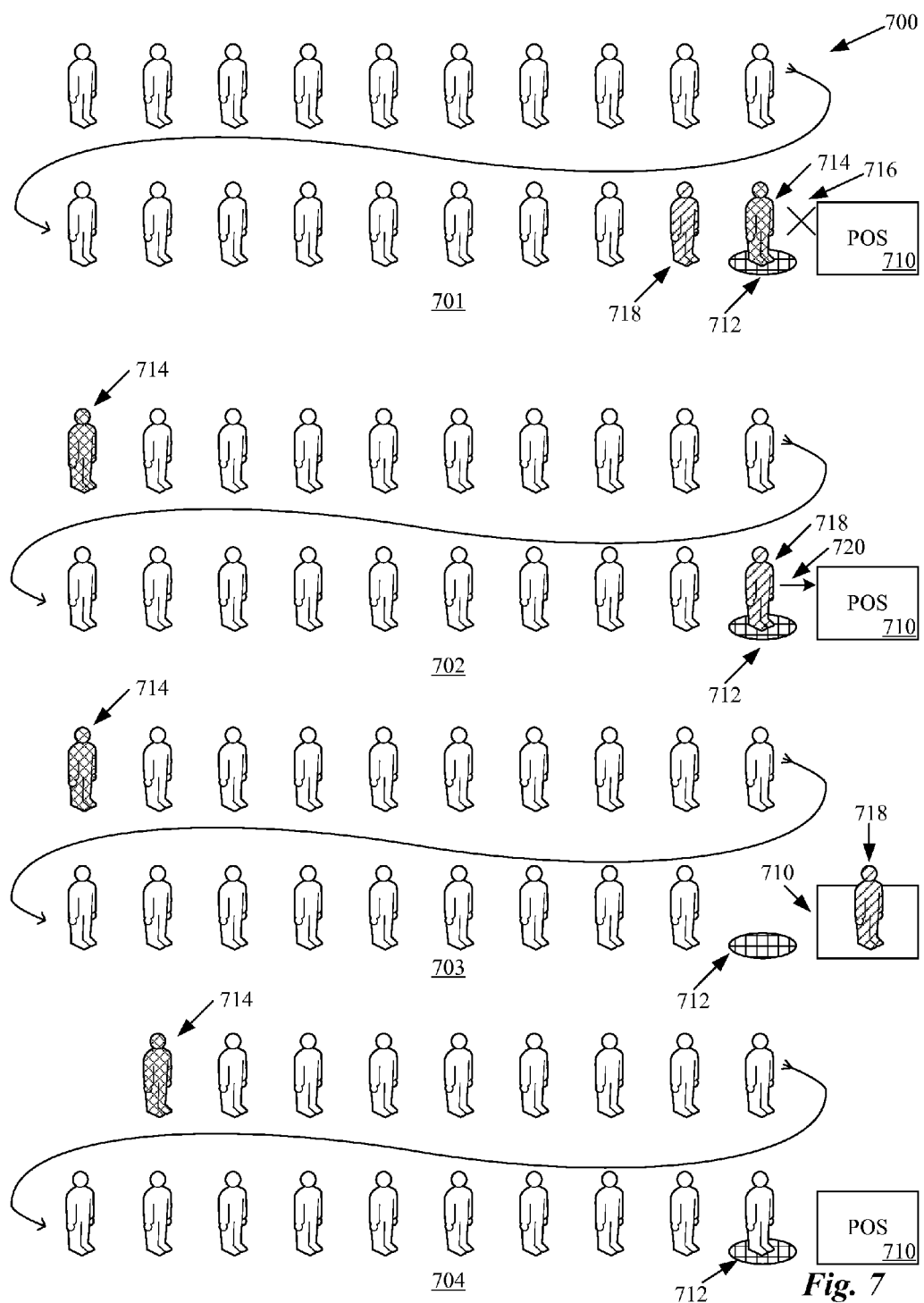
FIG. 7 conceptually illustrates an example embodiment of a virtual waiting line.

FIG. 7 conceptually illustrates an example embodiment of a virtual waiting line. In this example embodiment, when a customer is not ready to check out when they reach the front of the line, the system moves that customer to the back of the virtual waiting line. The figure is shown in four stages 701-704. Stage 701 includes virtual waiting line 700, a point of sale 710, a front position 712, an unready customer 714, an indicator 716 that customer 714 is an unready customer, and a ready customer 718. The virtual waiting line 700 is filled with customers carrying mobile devices running an application that embodies the invention. The mobile device and/or the system may determine that the customer has entered the store using one or more of the detection methods described with respect to method 200 of FIG. 2.

Customers may be added to the back of the virtual waiting line 700 as they come into the store. Alternatively, the customer may not added to the virtual waiting line automatically, but may be provided with an option on their mobile device to be added to the virtual waiting line at their discretion. In some embodiments, a setting of the application that implements the integrated shopping system allows a customer to decide in advance whether to be added automatically or provided (e.g., upon entering the store) with an option to be added to the virtual waiting line at their discretion.

The customers are then free to shop in the store without losing their place in the virtual waiting line 700. As customers purchase their items and check out of the store, the rest of the customers in the virtual waiting line 700 advance. When a customer reaches the front position 712, the system determines whether the customer is ready to check out (see e.g., the description of operation 630 in FIG. 6). In stage 701, the customer in the front position 712 is an unready customer 714. Unready customer 714 is not ready to check out as shown by indicator 716. In this example embodiment, the unready customer 714 is then moved to the back of the virtual waiting line 700 in stage 702. Stage 702 also includes indicator 720 showing that ready customer 718 is ready to check out.

In stage 703, ready customer 718 goes to point of sale 710. In this conceptual illustration, this corresponds to the actual customer going to the register to check out. Various embodiments determine that a customer is checking out in various ways. The system may determine this from the proximity of the mobile device to a point of sale (e.g., a cash register), from a customer activating a control on the mobile device, from the customer holding the mobile device to an optical scanner while the mobile device displays an optically coded identifier of the customer and/or an account associated with the mobile device or the application on the mobile device, based on a signal received from the point of sale, and the like. With the front position 712 opened up, the rest of the virtual waiting line 700 moves forward in stage 704.

Figure 8:
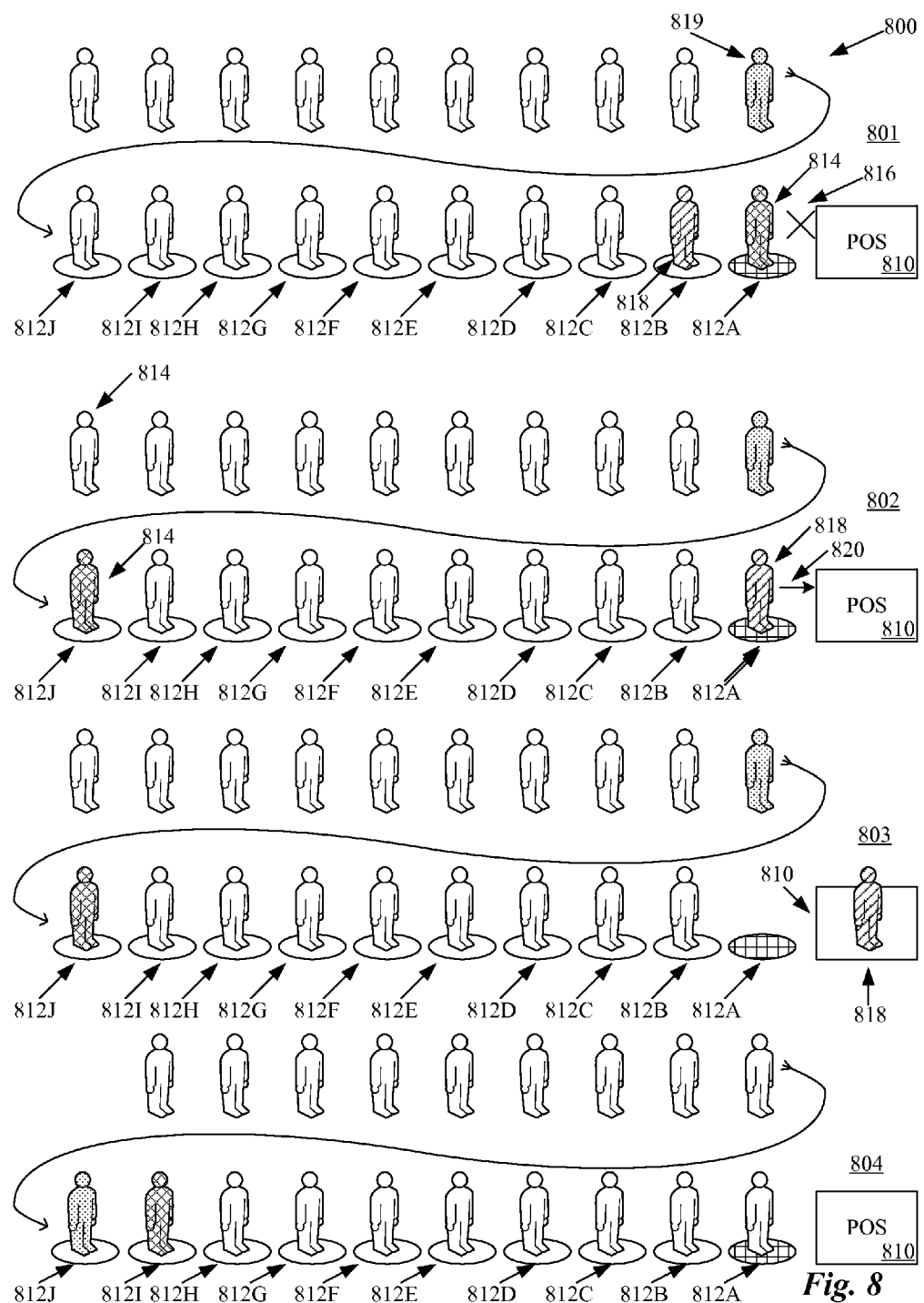
FIG. 8 conceptually illustrates a second example embodiment of a virtual waiting line.

FIG. 8 conceptually illustrates a second example embodiment of a virtual waiting line. In this example embodiment, when a customer is not ready to check out when they reach the front of the line, the system moves that customer, not to the back of the line, but to the back of a set of reserved spaces near the front of the line. The figure is shown in four stages 801-804. Stage 801 includes virtual waiting line 800, a point of sale 810, a front position 812A and nine reserved positions 812B-812J, an unready customer 814, an indicator 816 that customer 814 is an unready customer, a ready customer 818, and customer 819, who is just after the reserved positions. The virtual waiting line 800 is filled with customers carrying mobile devices running an application that embodies the invention. The mobile device and/or the system may determine that the customer has entered the store using one or more of the detection methods described with respect to method 200 of FIG. 2.

Customers are added to the back of the virtual waiting line 800 as they come into the store. As with the previously described embodiment, the customers are then free to shop in the store without losing their place in the virtual waiting line 800. As customers purchase their items and check out of the store, the rest of the customers in the virtual waiting line 800 advance. When a customer reaches the front position 812A, the system determines whether the customer is ready to check out (see e.g., the description of operation 630 in FIG. 6). In stage 801, the customer in the front position 812A is an unready customer 814. Unready customer 814 is not ready to check out as shown by indicator 816. Until this point in the method, the system of this example embodiment and the example embodiment of FIG. 7 behave the same. At this point however, in this example embodiment, the unready customer 814 is moved to the back (i.e., reserved position 812J) of the set of reserved positions 812B-812J (rather than to the back of the virtual waiting line 800) in stage 802. Stage 802 also includes indicator 820 showing that ready customer 818 is ready to check out. In stage 803, ready customer 818 goes to point of sale 810. In this conceptual illustration, this corresponds to the actual customer going to the register to check out. Various embodiments determine that a customer is checking out in various ways. As described with respect to FIG. 7, the system may determine this from the proximity of the mobile device to a point of sale (e.g., a cash register), from a customer activating a control on the mobile device, from the customer holding the mobile device to an optical scanner while the mobile device displays an optically coded identifier of the customer and/or an account associated with the mobile device or the application on the mobile device, based on a signal received from the point of sale, and the like. With the front position 812 opened up, the rest of the virtual waiting line 800 moves forward in stage 804, including customer 819, who moves into the last reserved position 812J.

The above described system uses nine reserved positions as well as a front position. However, one of ordinary skill in the art will understand that in other embodiments, other numbers of reserved positions are provided (e.g., 1, 2, 5, 20, and the like). Similarly, other embodiments may use a variable number of reserved positions, with the number varying based on one or more factors such as line length, time of day, and the like. The system may provide additional reserved spaces when a customer who has not previously reached the front of the line (and been sent back as unready) is sent back.

This example embodiment has benefits over the example embodiment of FIG. 7. For example, in the embodiment of FIG. 7, a customer who is informed by the system that he is approaching the front of the line is pressured to cut short his shopping trip and check out rather than risk being sent to the back of what could be a long virtual line. In the embodiment of FIG. 8, a customer who is nearing the front of the line will not have to worry about being sent too far back, and is therefore free to continue shopping, to the benefit of both the customer and the merchant. However, the described system of FIG. 8 does create the possibility of an unwanted situation, when all ten of the front customers are unready. Such a situation would waste the time of the checkout station and/or a clerk running that station and the time of other waiting customers because a finite amount of time would be required to determine that each customer was not ready each time the customer reached the front. This would lead to no one checking out for that time. Accordingly, the system may place the reserved positions some number of spaces (e.g., three spaces, five spaces, and the like) back from the front position. The system might then allow the customer just behind the reserved positions to skip the reserved positions whenever someone is sent to the back. Such a system allows customers who have not had the opportunity to check out to reach the checkout area without being blocked (in the virtual waiting line) by a mass of unready customers.

Other systems may handle the problem of masses of unready customers in other ways. Some systems might send customers to the back of the virtual waiting line unless they indicate (e.g., using a control of the application) that they are not ready before they reach the front. Such an indication would allow the system to skip their turn without waiting. Similarly, the application may have a toggle that can be set to "ready" or "unready." In such a system, customers who reach the front of the line while their toggle is set to "unready" are skipped until the customer switches the toggle to "ready." At that point, the customer proceeds through the reserved positions of the virtual waiting line until they reach the front. In some such systems, a customer who indicates "ready," but does not present themselves at the point of sale when their turn arrives, will be sent to the back of the line, rather than to the back of the reserved positions.

Still other systems could simply send a customer who has missed his turn to check out a particular number of times (e.g., one time, two times, and the like) to the back of the reserved positions and send customers who missed their turn more than that number of times to the back of the virtual waiting line.

Merchants sometimes have preferred classes of customers (referred to herein as very important people (VIPs)). To attract and please such customers, a merchant may desire to assign them a better position in a virtual waiting line than an ordinary customer would receive upon entering the store. The system may function better when each customer is aware of his place in the virtual waiting line, allowing each customer some advance warning of when it will be their turn to check out. However, in a system which both notifies customers of their place in the virtual waiting line and allows VIPs to start at a better position in line, ordinary customers would be moved back. Customers might resent being moved from (for example) $4^{th}$ in line to $5^{th}$ in line to accommodate a VIP. Accordingly, an ideal system would allow adding VIPs at advantageous positions, without ever moving a customer backward in their position numbers.

Figure 9:
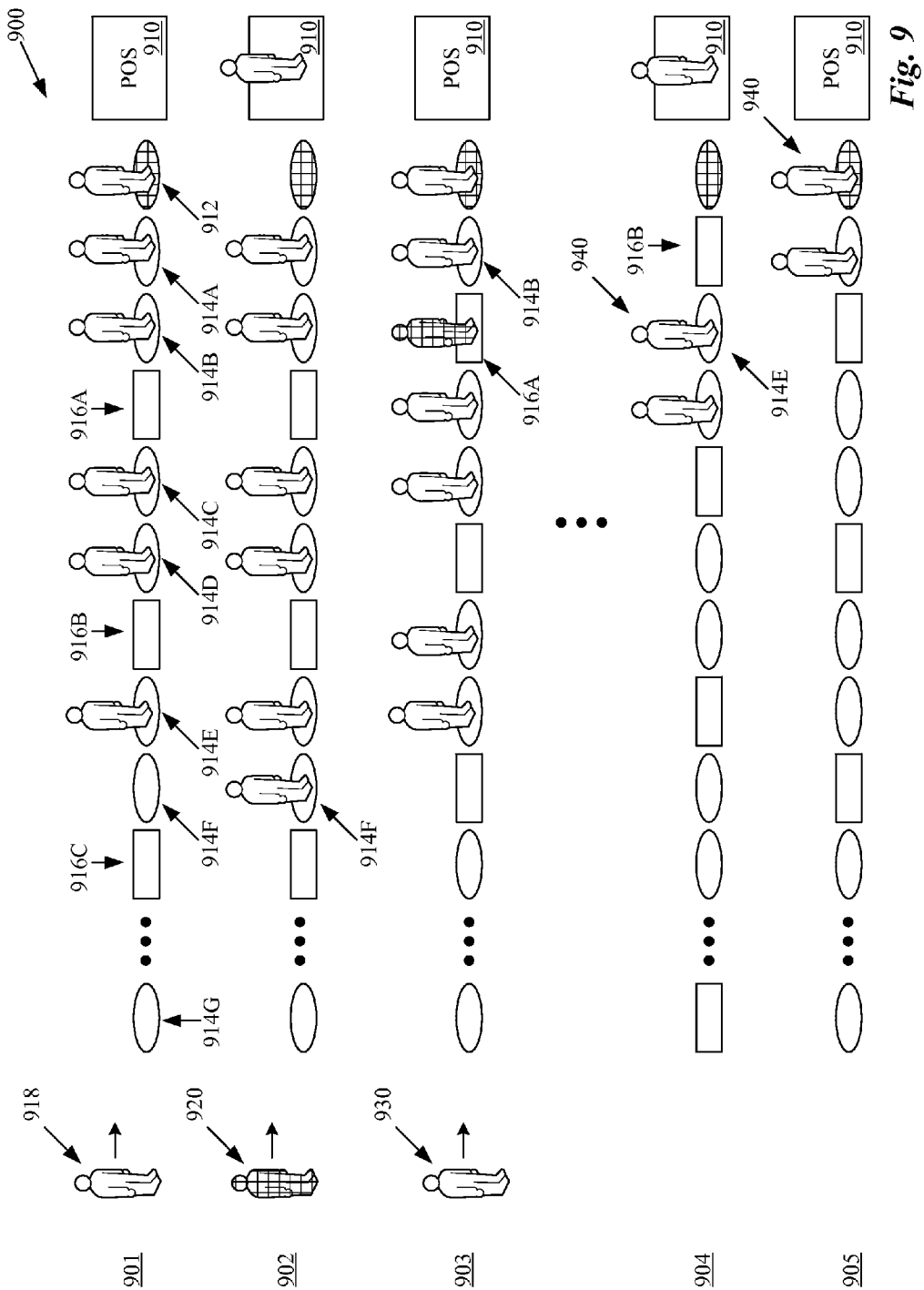
FIG. 9 conceptually illustrates a third example embodiment of a virtual waiting line.

FIG. 9 conceptually illustrates a third example embodiment of a virtual waiting line. In this example embodiment, VIPs are provided with more advantageous positions in a virtual waiting line. The VIPs may be designated as VIPs for any reason the merchant implementing the system wants. VIPs could fall into any of several categories such as first time customers, frequent repeat customers, customers who spend more than a certain amount on one or more visits, customers who spend more than a certain amount over some period of time, and the like. The figure includes virtual waiting line 900 in stages 901-905. Stage 901 includes point of sale 910, front position 912, ordinary positions 914A-914G, VIP positions 916A-916C, and ordinary customer 918. Customers in ordinary positions 914A and 914B are notified that they are second and third in line, respectively. Because VIP position 916A is empty, no one is told they are fourth in line in stage 901. Customers in ordinary positions 914C and 914D are notified that they are fifth and sixth in line, respectively, and the like. Ordinary customer 918 has just entered the store with his mobile device with an application of the system and is therefore added to the virtual waiting line 900. Because customer 918 is an ordinary customer, he is added to the best open ordinary position 914F (as shown in stage 902). In stage 902, VIP customer 920 enters the store with his mobile device running the application of the virtual waiting line system. Because the VIP customer 920 is a VIP, he is added to the best available VIP position 916A. By stage 903, VIP position 916A has moved up to third in line, so VIP 920 is notified by the system (e.g., via a display on the mobile device or physical shopping cart) that he is third in line. Since the VIP position 916A was held in reserve for a VIP, none of the ordinary customers need to be moved back to accommodate the VIP.

In stage 904, enough time has passed that customer 940 is third in line in ordinary position 914E. In that time, no VIP has entered the store, so an empty VIP position 916B is second in line. Since the VIP position 916B is empty when it reaches the front of the line, it is skipped and ordinary customer 940 goes from third in line to first in line, skipping second place. Going from third place right to first place seems like a fortunate event to most customers. Therefore, instead of creating resentment for sometimes moving them backward, the example embodiment sometimes provides them something that makes them more satisfied with the shopping experience.

In addition to or instead of VIP positions being provided when a customer enters a store, the system may provide upgraded positions in a virtual waiting line to customers who put particular items in their shopping carts (e.g., customers who buy caviar), put more than a threshold value of items in their shopping carts (e.g., items whose aggregate price is greater than $200), put items that represent more than a threshold level of profit for the store in their shopping carts (e.g., items for which the aggregate profit is more than $100), or put items that represent more than a threshold percentage of profit (e.g., 30% profit) for the store in their shopping carts. The system may determine what items a customer has in their shopping cart based on the customer scanning the items as the items are gathered. The system may also determine what items the customer has in their shopping carts based on some other method, such as RFID tags on the items and one or more RFID readers on the cart. The system may repeatedly advance a customer as various thresholds are reached.

Figure 10:
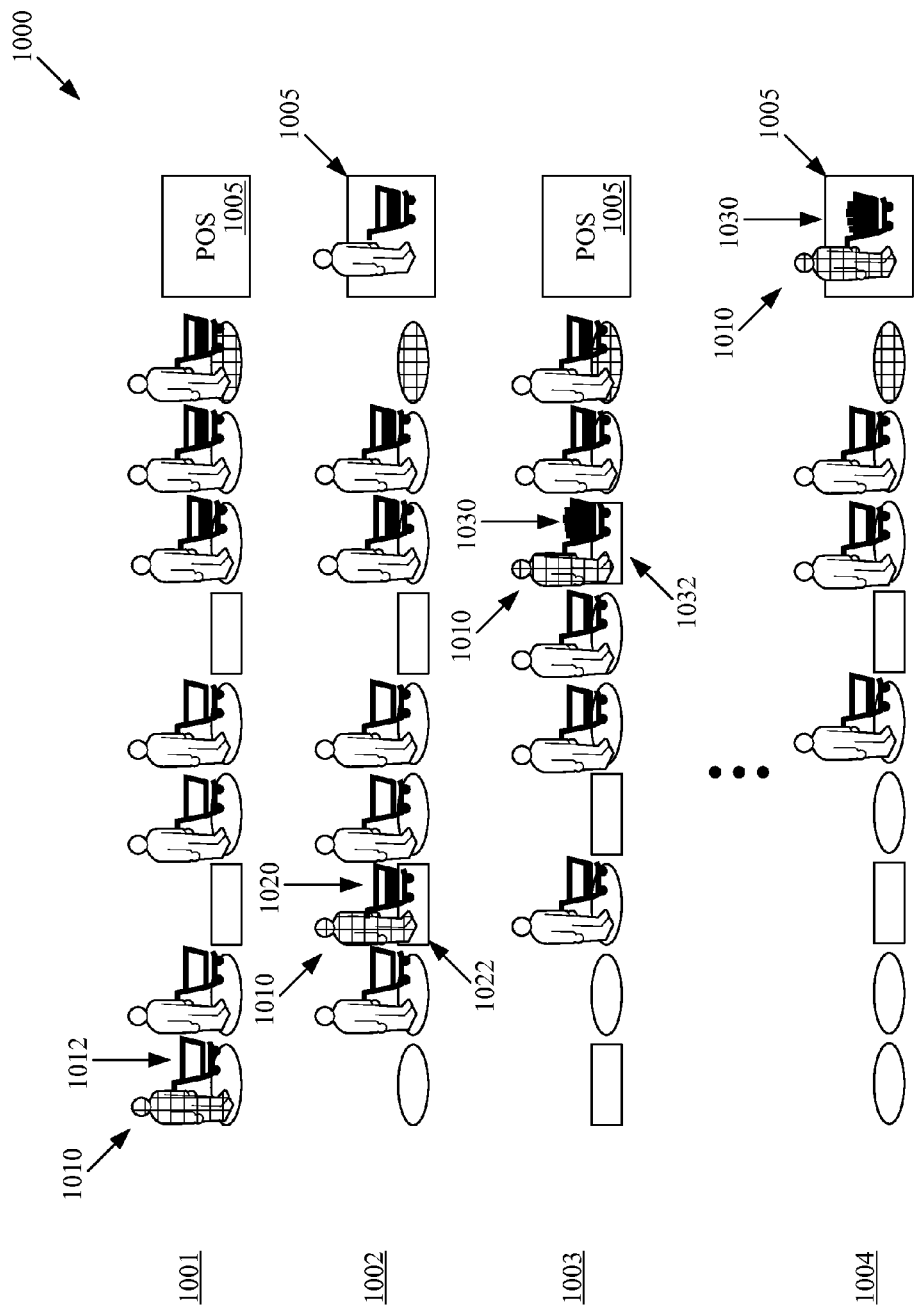
FIG. 10 conceptually illustrates an example embodiment for advancing a customer in a virtual line based on the goods the customer has placed in a shopping cart.

FIG. 10 conceptually illustrates an example embodiment for advancing a customer in a virtual line based on the goods the customer has placed in a shopping cart. The figure illustrates a virtual waiting line 1000 in four stage 1001-1004 as the system moves a customer 1010 up in the virtual waiting line 1000 toward the point of sale 1005. In stage 1001, the customer 1010 has entered the store and the system assigns the customer 1010 a position at the back of virtual waiting line 1010. In this stage, the customer 1010 has not placed anything in a physical shopping cart, as indicated by empty shopping cart 1012.

In stage 1002, the customer 1010 has placed a moderate number of items in a physical shopping cart (i.e., scanned the items or placed them in a cart that can scan the items automatically) as indicated by half-full shopping cart 1020. In this example, the amount the customer 1010 has placed in the physical shopping cart exceeds a threshold amount for moving the customer ahead in the line. Accordingly, in stage 1002, the system has reassigned customer 1010 to position 1022, a position previously held vacant in order to have a position in line to move such customers without having to push any customers already in the line backward.

In stage 1003, the customer 1010 has placed even more items in the physical shopping cart as indicated by the full shopping cart 1030. In this example embodiment, the system moves customers up at multiple thresholds. The customer 1010 in stage 1003 has passed the second threshold. Accordingly, the system has moved the customer 1010 to position 1032. Position 1032 was another position held vacant to allow a big-spending customer to be moved forward without moving any other customer backward. In stage 1004, customer 1010 reaches the point of sale 1005 and checks out.

Figure 11:
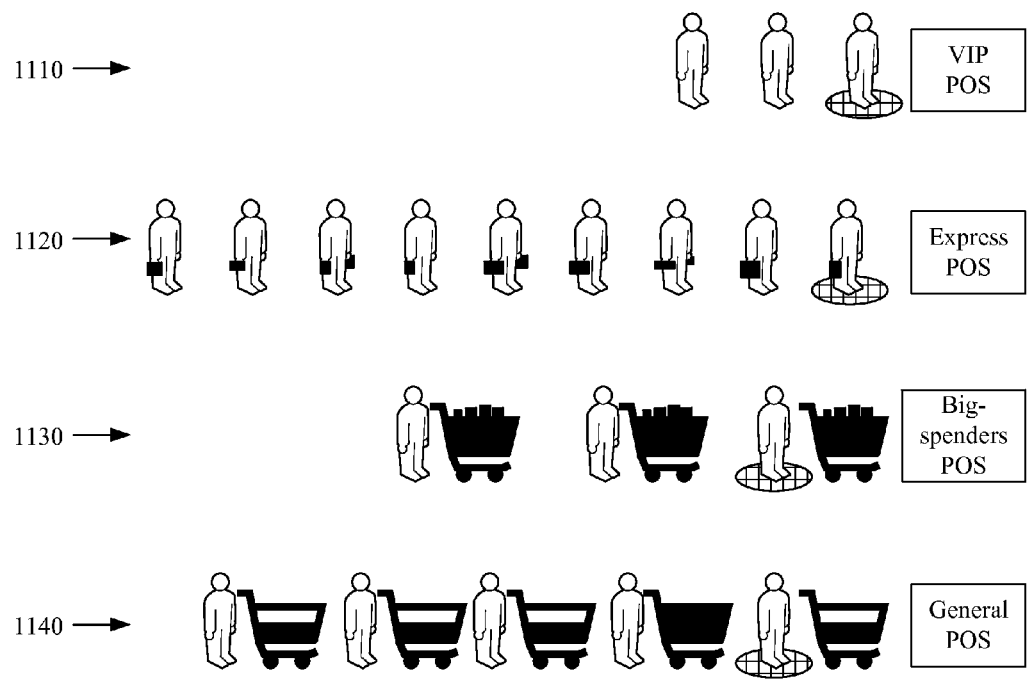
FIG. 11 conceptually illustrates an example embodiment that provides multiple virtual waiting lines where each virtual waiting line is for a different type of customer.

While the above described embodiments include a single virtual waiting line, in some embodiments, the system provides multiple virtual waiting lines. FIG. 11 conceptually illustrates a system that provides multiple virtual waiting lines where each virtual waiting line is for a different type of customer. The figure includes VIP virtual waiting line 1110, express virtual waiting line 1120, big-spenders virtual waiting line 1130, and general virtual waiting line 1140. Customers deemed important for whatever reason are assigned to the VIP virtual waiting line 1110. Important customers may include frequent customers, new customers, customers who frequently spend above a particular threshold or who spend more in the aggregate over some period of time than another threshold, and the like.

Customers with very few items (e.g., fewer than ten, fewer than eight, and the like) may be assigned to an express virtual waiting line 1120. Such customers may be identified when they enter the store by activating a control in the shopping application that indicates they are buying fewer than a particular number of items. Customers who are not VIPs may also be assigned to the express virtual waiting line 1120 by default unless more items are transferred from a virtual shopping cart to an in-store shopping list than a threshold for the express virtual waiting line 1120. Customers assigned to the virtual waiting line 1120 by default may be moved to other virtual waiting lines after they add more items to their physical shopping cart (e.g., when they scan more items with the mobile device, and the like) than the threshold for the express virtual waiting line 1120.

In cases where a customer decides to add (e.g., by scanning items, placing items in a physical cart that detects items automatically, and the like) more items into their physical cart than what they have on their original in-store shopping list (e.g., additional types of items or a higher quantity of the items on the in-store shopping list than the in-store shopping list indicates), their in-store shopping list shall be adjusted accordingly. This can result in a re-assignment to a different shopping line as described below with respect to the general shopping line 1140.

Customers identified as big-spenders may be placed in a big-spenders' virtual waiting line 1130. Customers may be identified as big-spenders when they put particular items in their shopping carts (e.g., customers who buy caviar), put more than a threshold value of items in their shopping carts (e.g., items whose aggregate price is greater than $200), put items that represent more than a threshold level of profit for the store in their shopping carts (e.g., items for which the aggregate profit is more than $100), or based on multiple criteria, such as customers who put items that represent more than a threshold percentage of profit (e.g., more than 30% profit) and more than an aggregate threshold price (e.g., $100) in their shopping carts. The system may determine what items a customer has in their shopping cart based on the customer scanning the items as the items are gathered. The system may also determine what items the customer has in their shopping carts based on some other method, such as RFID tags on the items and one or more RFID readers on the cart.

Customers who do not fall into any other designated category may be placed in a general virtual waiting line 1140. As mentioned above, in some cases customers may be moved from one virtual waiting line to another, such as when a customer is moved from the express virtual waiting line 1120 into the general virtual waiting line 1140 when the customer exceeds the express number of items or when a customer is moved from the general virtual waiting line 1140 to the big-spender virtual waiting line 1130 after the customer places particular items or items with an aggregate value above a threshold value in their physical shopping carts.

Although most of the above described embodiments place customers in various positions in virtual waiting lines automatically, in some embodiments, customers may choose to exchange places with someone else in a virtual waiting line. Accordingly, the application may provide an interface that allows a customer to send an offer to exchange positions to other customers in the store. For example, a shopper who is informed (by the application of this example embodiment) that he is fifth in line may want more time to shop, while a customer who is twenty-fourth in line may wish to check out as soon as possible. The application may provide an interface to allow the customer to offer to exchange positions with someone between two positions.

The two positions may be individually selectable. That is, the application may provide an option for a starting position and a second option for an ending position. Alternatively, the two positions may be jointly selectable. That is, various pairs of starting and ending positions are offered (e.g., the customer can select positions 10-19, positions 20-29, or positions 30-39).

In some embodiments, the system actively seeks customers willing to exchange positions. When a particular customer offers to exchange positions, the applications on the mobile devices of the customer(s) in the chosen position(s) may ask those customers whether they are willing to exchange positions with someone in the position of the particular customer. The system may then exchange the positions of the particular customer and the first customer to accept the offer. Alternatively, the system may be reactive. For example, the system may receive offers to exchange positions, but not ask other customers whether they are willing to exchange places. Instead, the system determines when two offers are reciprocal and automatically exchanges the customers making the reciprocal offers. For example, if the customer in position 5 offers to exchange places with anyone in positions 20-30, and a customer in position 29 offers to exchange places with anyone in positions 1-10, then the system will automatically exchange their positions. The applications of those two customers would then inform them of the exchange. A server dedicated to the individual store or a server that implements the system for multiple stores may determine what exchanges should be made and send the messages to the applications to notify the customers of the exchange. Alternatively, the mobile devices themselves may collectively make the exchanges and notify a server of the store or a central server.

Figure 12:
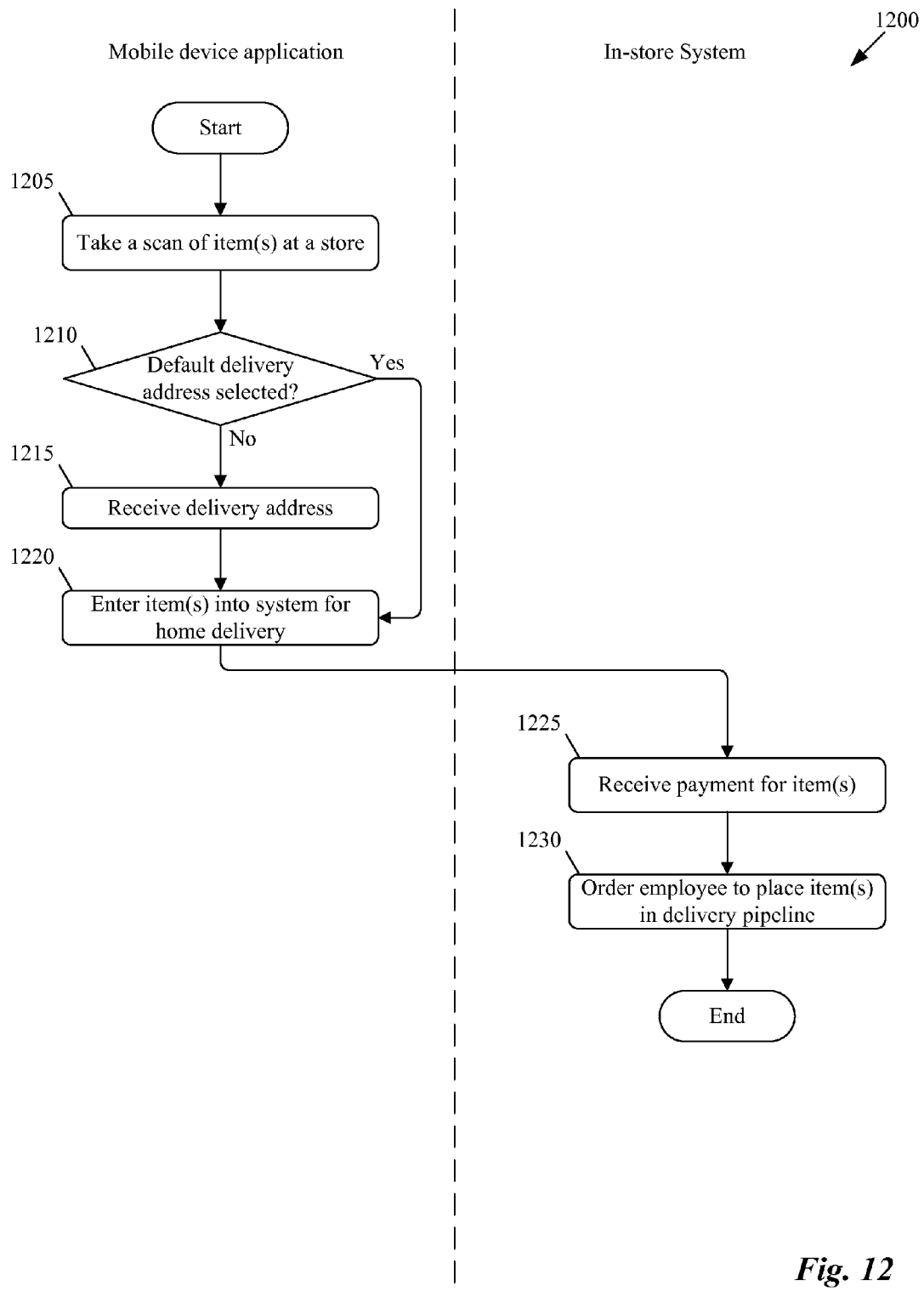
FIG. 12 conceptually illustrates a method, in accordance with an example embodiment, for automatic home delivery.

The integrated shopping system may provide an interface to allow a customer to make an in-store purchase that will be automatically delivered to the customer's home without the customer directly interacting with an employee. FIG. 12 conceptually illustrates a method, in accordance with an example embodiment, for automatic home delivery. In the example embodiment, operations 1205-1220 are performed by an application on a customer's mobile device. The application interfaces with an in-store system, which performs operations 1225-1230. The method 1200 takes (at 1205) a scan of one or more items the store. In the example embodiment, the scan is taken by a mobile device used by a customer at a display location of the item. In other embodiments, the scan may be taken at a point of sale of the store by a scanner provided by the operators of the store. The method of still other embodiments may also provide options for either scanning at a display location (with a mobile device) or scanning at a point of sale (with a scanner provided by the store operators). Both options have advantages. When items are scanned at the point of sale, it is not necessary to have a store employee collect the items. This option is most useful when a large number of smaller items are to be delivered. When items are scanned at the display location, the customer does not have to move them to the point of sale. This option is most useful with larger, heavier items, or when the customer has limited strength due to advanced age or infirmity.

The method then determines (at 1210) whether a default delivery address has been selected. The application of the mobile device may provide an input option for a default delivery address when the application is initially installed and/or as a setting option. The system (e.g., via the application on the mobile device or a server) may automatically select a default delivery address (if any). Alternatively, the system may offer the default delivery address to the customer, and the customer can determine whether to use the default delivery address or another address. When a default delivery address has not been selected, the method receives (at 1215) a delivery address (e.g., an address entered by the customer). The mobile device of some embodiments allows a customer to select a date and time at this point in the method (e.g., using an interface similar to the interface shown in stage 1403 of FIG. 14, described below). Once an address (and in some embodiments, a date and time) has been selected (either by default or directly provided by the customer), the method 1200 enters (at 1220) the item(s) into the system for home delivery.

As mentioned above, the remaining operations of the method 1200 are performed by the in-store systems. Such systems may be performed by computing devices physically located in the store or located elsewhere. The method receives (at 1225) payment for the items. In various embodiments the payment may be made by one or more different methods. The payments may be via credit card provided by the mobile device, via any standard means of payment (cash, check, credit card) presented at a point of sale, and the like. The in-store systems then order (at 1230) a store employee to place the item in the delivery pipeline for subsequent delivery to the delivery address. In some embodiments, the delivery is to a physical address (e.g., a postal address). Although the items delivered to a physical address may include non-transitory machine readable media (e.g., CDs, DVDs, and the like), in such embodiments, the items themselves are physical items, not downloads or other digital data sent over a network. The exact physical item selected may be placed into the delivery pipeline or the type of item selected (but not necessarily the exact physical item) may be placed into the delivery pipeline. In some embodiments, whether the exact item or just an item of the same type is delivered varies based on the nature of the item and/or on customer preferences.

In embodiments which sometimes provide the actual item and sometimes provide the type of item, the specific item is generally not provided in cases in which the exact item is unlikely to matter. For example, when a customer buys a television, the customer generally wants a particular model of television, but does not care which particular physical television is provided. In contrast, in cases in which the exact item does matter, the system may provide the exact item. For example, the exact item matters when a customer selects items whose quality is likely to vary from item to item, such as fresh produce (i.e., fruits and vegetables) or collectible items.

In the example embodiment, the purchase is made within a physical store and the delivery is made from the physical store. However, in other embodiments, the delivery is made from a separate location (e.g., from an off-site warehouse or directly from the manufacturer). Once the item(s) are placed in the delivery pipeline, the method 1200 ends.

Figure 13:
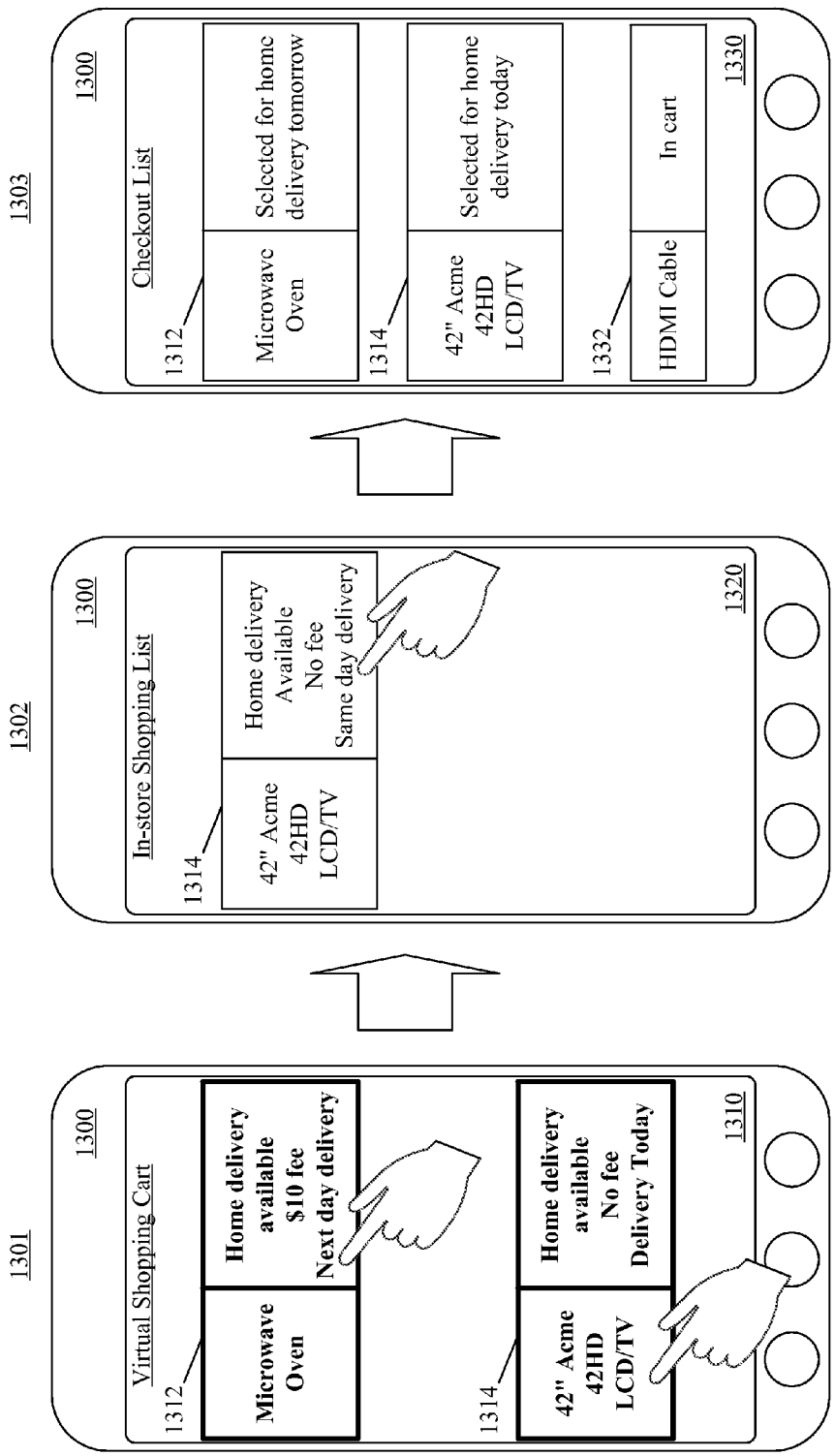
FIG. 13 illustrates interfaces of an example application for selecting home delivery for items in a virtual shopping cart and on an in-store shopping list.

The application may indicate in a virtual shopping cart or in an in-store shopping list whether an item qualifies for home delivery. The application may also indicate relevant conditions for home delivery (e.g., whether additional fees apply, what the estimated delivery date would be if the item is purchased at that store that day, and the like). FIG. 13 illustrates interfaces of an example application for selecting home delivery for items in a virtual shopping cart and on an in-store shopping list. In the embodiment of FIG. 13, the system allows a customer to select home delivery either directly from the virtual shopping cart or from the in-store shopping list. The figure is shown in three stages 1301-1303. In stage 1301, the customer enters a physical store that implements the integrated system. When the customer enters the store, the customer has a mobile device 1300 with access to a virtual shopping cart 1310 filled with items including a microwave oven 1312 and a 42" liquid crystal display television (LCD TV) 1314. As previously described with respect to FIG. 3, the system may provide the application of the mobile device with a list of items in the virtual shopping cart that are available in the store from a server (not shown). Additionally, in this example embodiment, the server may provide the application on the mobile device with data identifying home delivery options. The system may store the shopping list on the mobile device 1300. Alternatively, the mobile device may access a shopping list stored on a server.

The example embodiment allows the customer to select items for in-store pickup by selecting the left side of items 1312 and 1314. Additionally, the example embodiment allows a customer to select items for home delivery by selecting the home delivery conditions on the right side of the items 1312 and 1314. In stage 1301, the customer selects the microwave oven 1312 for home delivery by selecting the home delivery details on the right side of the microwave oven item 1312. The home delivery options include a $10 delivery charge and an estimate that the microwave oven will be delivered the next day after the customer purchases it. The mobile device may then provide an interface such as the one shown in FIG. 14 to allow the customer to select delivery options for the microwave oven 1312. The mobile device may also defer the display of such an interface until the customer checks out to enable the customer to select delivery options for multiple items simultaneously. Additionally, as shown in FIG. 13, the customer has chosen the LCD TV 1314 to be added to the in-store shopping list. A possible reason for a customer selecting the microwave for delivery without adding it to the in-store shopping list is that the customer has decided to buy the microwave oven based on the specifications of the microwave oven without needing to see an actual example of that model of microwave oven. In contrast, the customer may want to see an actual example of the selected television model to judge the quality of the picture himself.

In stage 1302, the mobile device 1300 displays an in-store shopping list 1320 of items transferred from the virtual shopping cart 1310 after the customer selects them for in-store pickup. In some embodiments, the customer is then left to find the items on their own. In other embodiments, the system gives the customer directions to the items on the in-store shopping list 1320. The uncollected items may be displayed on the mobile device as points on a map of the store; the items may be provided on a list of aisle numbers and locations along aisles; or other methods may be used to direct the customer to the items (e.g., arrows on the mobile device, a heads up display on a wearable mobile device such as Google Glass™, Pebble™ smartwatch, and the like). In the example embodiment, items selected for home delivery from the virtual shopping cart 1310 are not transferred into the list of items on the in-store shopping list 1320. In this example, the microwave oven 1312 is not transferred to the in-store shopping list 1320. The LCD TV 1314 is transferred to the in-store shopping list 1320. In embodiments that direct a customer to items on their in-store shopping list 1320, the mobile device directs the customer to the LCD TV 1314 (e.g., as shown in FIG. 5). In the example of FIG. 13, in stage 1302, after the customer sees the LCD TV 1314 in the store (not shown), the customer selects the home delivery option for the LCD TV 1314. The mobile device may then provide an interface such as the one shown in FIG. 14 to allow the customer to select delivery options for the LCD TV 1314. The mobile device may also defer the display of such an interface until the customer checks out to enable the customer to select delivery options for multiple items simultaneously (e.g., as shown in FIG. 14, stage 1403).

In stage 1303 of FIG. 13, the mobile device shows a "checkout list" 1330 which, in this example embodiment, includes items selected for home delivery and any items added to the physical shopping cart. Here, the customer has added a high-definition multimedia interface (HDMI) cable 1332 to the physical shopping cart. The customer can then pay for the microwave oven 1312 and the LCD TV 1314 along with any items in the physical shopping cart. The point of sale may allow the customer to purchase all the items in the shopping cart and selected for home delivery in a single transaction.

Figure 14:
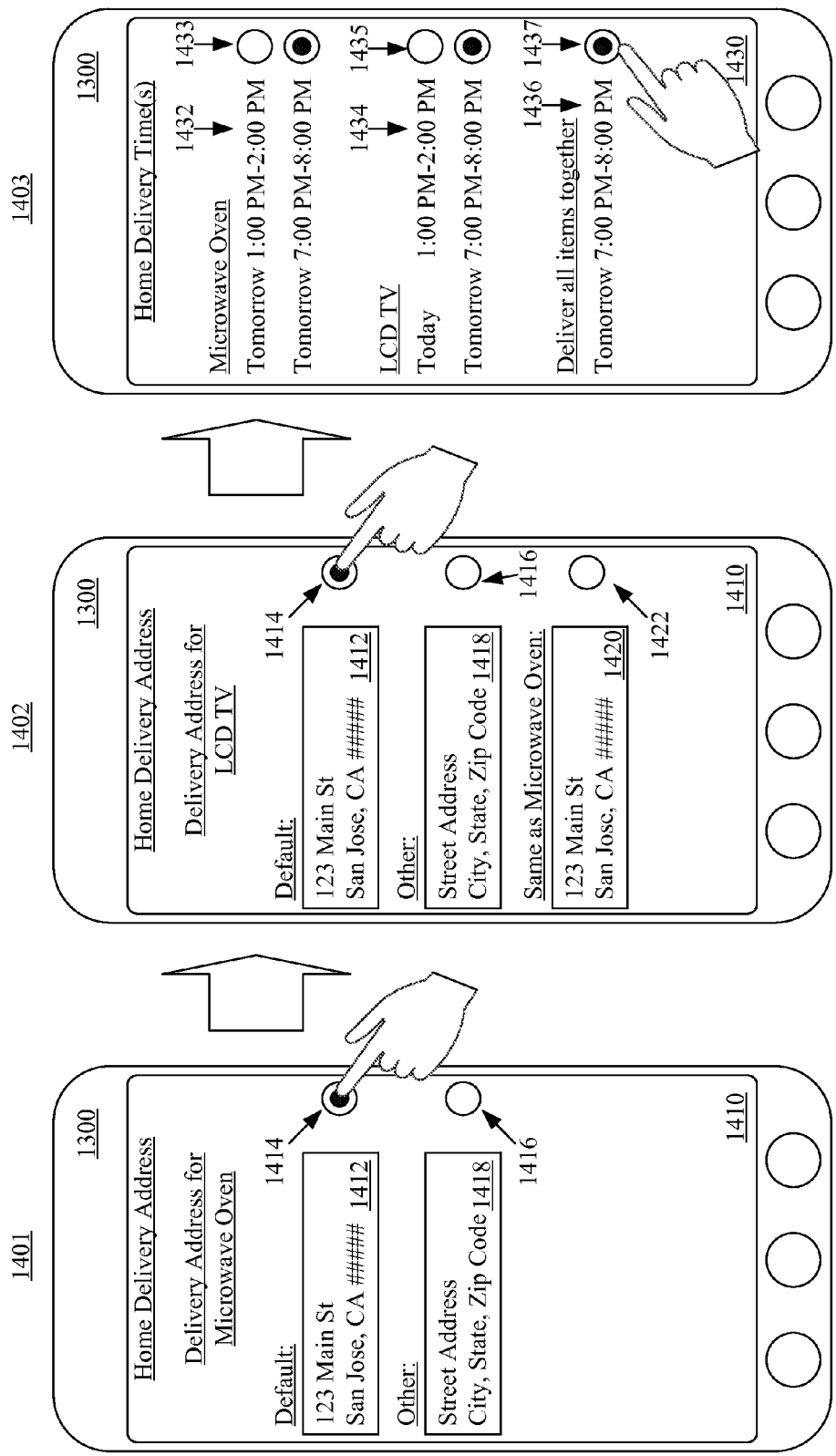
FIG. 14 illustrates an example interface for arranging details of home deliveries.

FIG. 14 illustrates an example interface for arranging details of home deliveries. The illustrated interface is being used by the customer to arrange for home delivery for the microwave oven and LCD TV selected for home delivery in FIG. 13. The figure is shown in three stages 1401-1403. In stage 1401, the mobile device 1300 displays home delivery address interface 1410 and allows a customer to select a delivery address for the microwave oven. In this example interface, the customer can select a default address shown in box 1412 (e.g., an address entered when the application was installed or entered using settings of the application) by selecting radio button 1414. The customer can also select an alternate address by selecting radio button 1416 and entering the alternate address in box 1418. Here, the customer has selected the default address shown in box 1412.

In stage 1402, the mobile device 1300 displays home delivery address interface 1410 and allows a customer to select a delivery address for the LCD TV. In this example interface, the customer can select a default address shown in box 1412 (e.g., an address entered when the application was installed or entered using settings of the application) by selecting radio button 1414. The customer can also select an alternate address by selecting radio button 1416 and entering the alternate address in box 1418. In this example interface, a customer also has the option to select the same delivery address as another item for which the customer has previously selected an address. Here, the customer has previously selected an address for delivering the microwave oven, so the interface 1410 displays the previously selected address in box 1420 and allows the customer to select that address by selecting radio button 1422. In other embodiments, the mobile device will not display redundant addresses. In such embodiments, when a customer selects the default address for an earlier item, the mobile device will simply display the default address once, and not provide a separate option for sending a later item to the "same address" as the earlier item.

Once delivery addresses are selected for all items, in stage 1403, the mobile device displays a delivery time interface 1430. In the example embodiment, the delivery time interface 1430 provides lists of available delivery times for various items. The delivery time interface 1430 displays a list 1432 of available times for delivering the microwave oven, along with radio buttons 1433 for selecting times on list 1432, a list 1434 of available times for delivering the LCD TV, along with radio buttons 1435 for selecting times on list 1434, and a list 1436 of available times for delivering all items together, along with a set of radio buttons 1437 for selecting a time at which all items can be delivered together. In the illustrated example, there is only one available delivery time at which all items can be delivered. Therefore the set of radio buttons 1437 only includes one radio button. However, in cases where there is more than one available delivery time at which all items can be delivered, the set of radio buttons 1437 may include multiple buttons.

In this example embodiment, selecting a time from the list 1436 of times available for delivering all items together automatically selects the corresponding times from the lists 1432 and 1434. The application may also allow a customer to arrange an at home pickup of an item (e.g., an item being exchanged or returned) either at the same time as one or more items are being delivered, or at a separate time.

In cases where more than one set of items have a common delivery address, the mobile device may provide options to deliver each set of items together. For example, when three items are to be delivered to a first address, five items are to be delivered to a second address, and two items are to be delivered to a third delivery address, the mobile device may offer an option to deliver the three items at a first time at the first address, a second (independent) option to deliver the five items at a second time to the second delivery address, and a third (independent) option to deliver the two items at a third time to the third delivery address.

Figure 15:
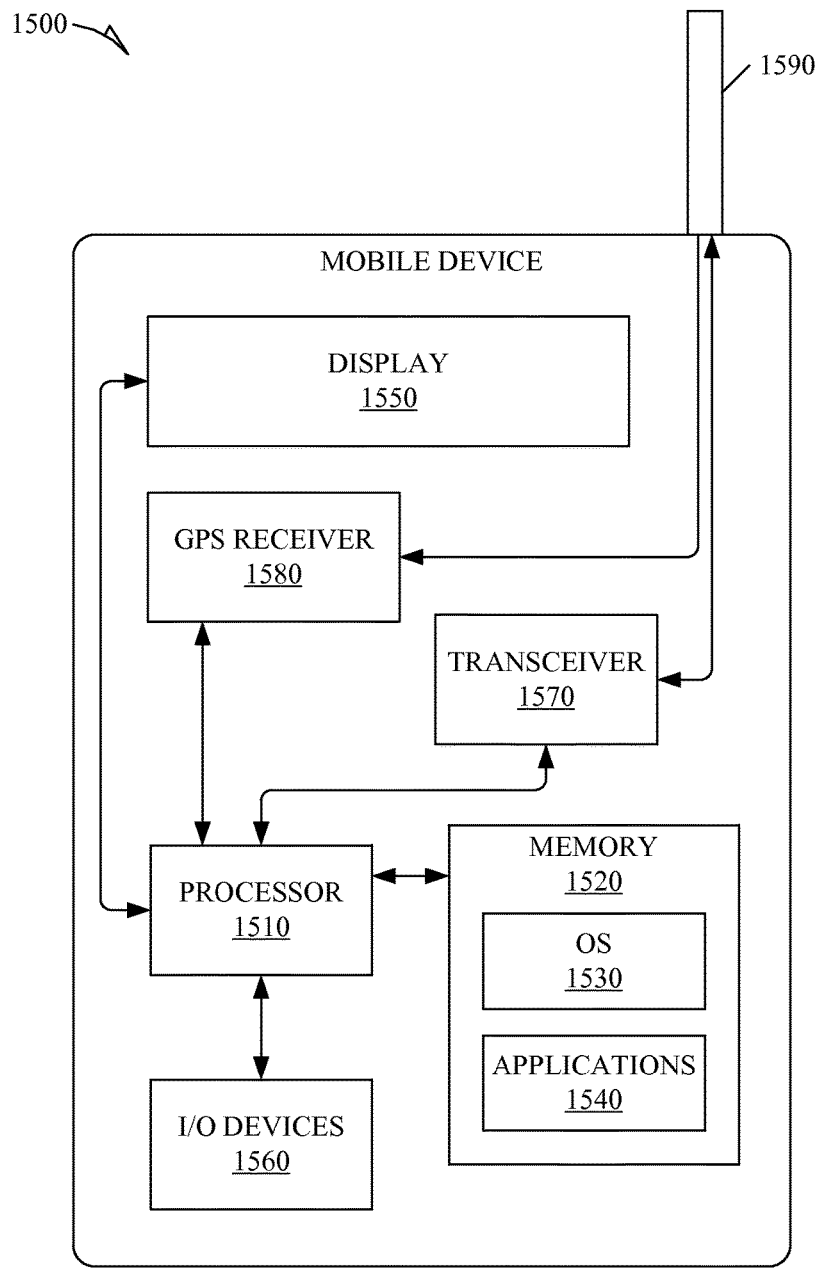
FIG. 15 is a block diagram illustrating a mobile device, according to an example embodiment.

FIG. 15 is a block diagram illustrating a mobile device, according to an example embodiment. The mobile device 1500 may include a processor 1510. The processor 1510 may be any of a variety of different types of commercially available processors suitable for mobile devices (for example, an XScale architecture microprocessor, a Microprocessor without Interlocked Pipeline Stages (MIPS) architecture processor, or another type of processor). A memory 1520, such as a Random Access Memory (RAM), a Flash memory, or other type of memory, is typically accessible to the processor. The memory 1520 may be adapted to store an operating system (OS) 1530, as well as application programs 1540, such as the above described integrated shopping application. The processor 1510 may be coupled, either directly or via appropriate intermediary hardware, to a display 1550 and to one or more input/output (I/O) devices 1560, such as a keypad, a touch panel sensor, a microphone, and the like. Similarly, in some embodiments, the processor 1510 may be coupled to a transceiver 1570 that interfaces with an antenna 1590. The transceiver 1570 may be configured to both transmit and receive cellular network signals, wireless data signals, or other types of signals via the antenna 1590, depending on the nature of the mobile device 1500. In this manner, a connection with a communication network may be established. Further, in some configurations, a GPS receiver 1580 may also make use of the antenna 1590 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors, processing units, or processor-implemented modules. The performance of certain of the operations may be distributed among the one or more processors, not only residing within a single machine, but deployed across a number of machines. In some example embodiments, the processor or processors may be located in a single location (e.g., within a home environment, an office or store environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 16:
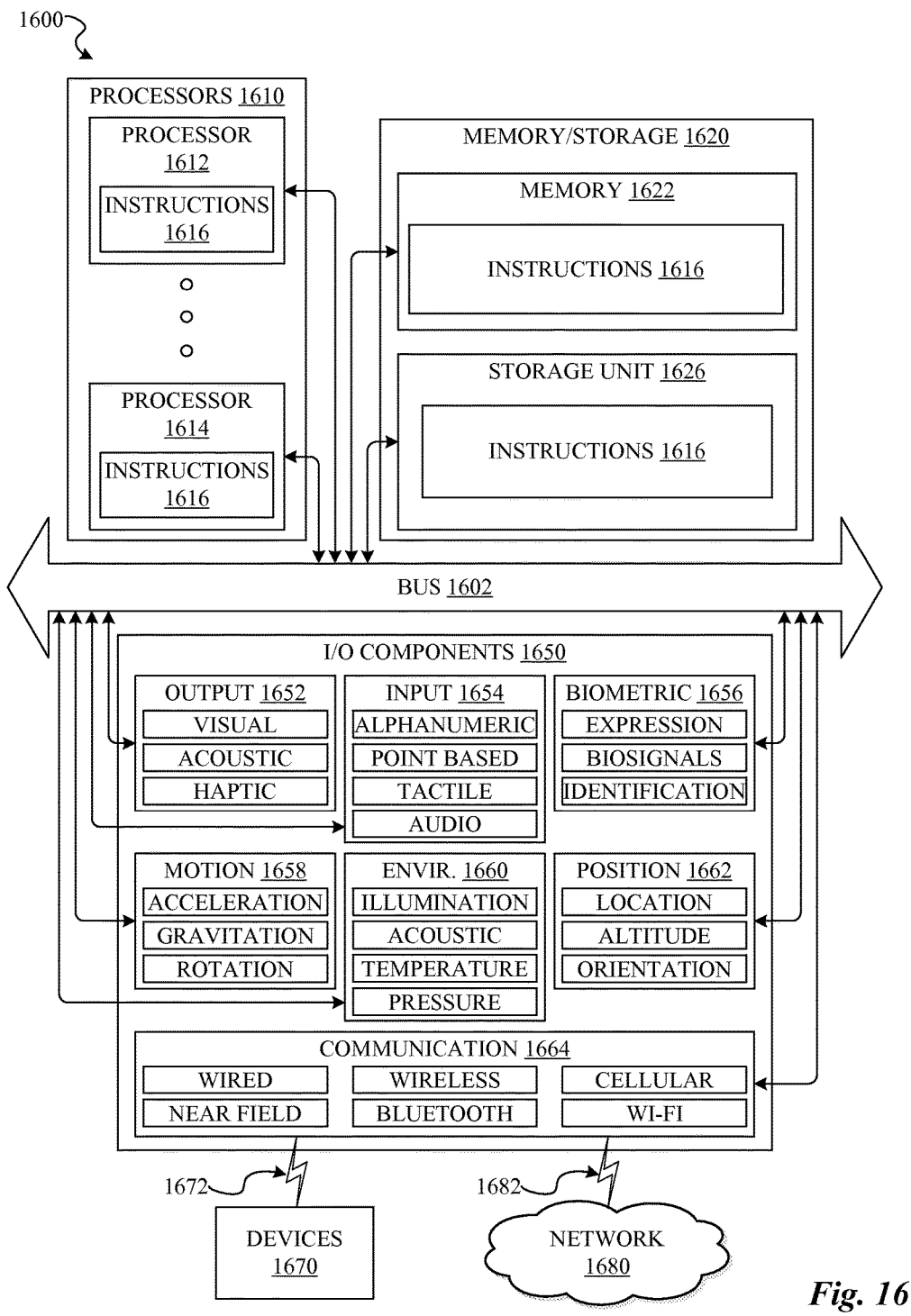
FIG. 16 is a block diagram illustrating components of a machine, according to some example embodiments.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. These instructions transform the general, non-programmed machine into a particular machine programmed to carry out the described and illustrated functions of the machine 1600 in the manner described herein. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. By way of non-limiting example, the machine 1600 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory/storage 1620, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core processor), multiple processors with a single core, multiple processors with multiples cores, or any combination thereof.

The memory/storage 1620 may include a memory 1622, such as a main memory, or other memory storage, and a storage unit 1626, both accessible to the processors 1610 such as via the bus 1602. The storage unit 1626 and memory 1622 store the instructions 1616 embodying any one or more of the methodologies or functions described herein. The instructions 1616 may also reside, completely or partially, within the memory 1622, within the storage unit 1626, within at least one of the processors 1610 (e.g., within the processor's cache memory), or any suitable combination thereof, during execution thereof by the machine 1600. Accordingly, the memory 1622, the storage unit 1626, and the memory of processors 1610 are examples of machine-readable media.

As used herein, "machine-readable medium" means a device able to store instructions and data temporarily or permanently and may include, but is not be limited to, RAM, read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672, respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Code Council Reduced Space Symbology two-dimensional (UCC RSS-2D) bar code, and other optical codes), or acoustic detection components (e.g., microphones to identify tagged audio signals). In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., Hypertext Transfer Protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

As used herein, the terms "Acme" and "Beta" are intended solely as examples to demonstrate that multiple brand names can be used in the system. No reference to any actual brands, businesses, or companies by those names is intended or implied.

What is claimed is:

1. A method comprising:
   receiving, by an order management module computing device, an indication that a mobile device has entered a proximity of a physical store;
   accessing, by the order management module computing device, virtual shopping cart data associated with the mobile device, the virtual shopping cart data describing a plurality of items;
   selecting, by the order management module computing device, a set of items to be purchased, the set of items to be purchased comprising items from the plurality of items that are part of an inventory of the physical store;
   receiving, by the order management module computing device and from the mobile device within the physical store, an identification, made by a customer using the mobile device, of an additional item in the physical store to be added to the items to be purchased, the items to be purchased comprising a first set of items to be delivered and a second set of items not to be delivered;
   receiving, by the order management module computing device and from the mobile device, a delivery address for a first set of items;
   receiving payment for the first set of items and the second set of items in a single transaction;
   placing items corresponding to the first set of items in a delivery pipeline for subsequent physical delivery to the delivery address; and
   authorizing removal of the second set of items from the physical store.

2. The method of claim 1, wherein receiving the identification of the additional item comprises receiving a scan of a visible identification code or image of the additional item scanned with an optical sensor of the mobile device.

3. The method of claim 1, wherein receiving the delivery address comprises receiving a command from the mobile device to use a default delivery address.

4. The method of claim 3, wherein receiving the delivery address further comprises sending a default delivery address to the mobile device before receiving the command.

5. The method of claim 1, wherein receiving the delivery address comprises receiving an entry of a delivery address on the mobile device.

6. The method of claim 1, wherein placing the items corresponding to the first set of items in the delivery pipeline comprises placing the items corresponding to the first set of items on a delivery vehicle at the physical store.

7. The method of claim 1, wherein placing the items corresponding to the first set of items in the delivery pipeline comprises placing the items corresponding to the first set of items on a delivery vehicle at a warehouse separate from the physical store.

8. The method of claim 1, wherein placing the items corresponding to the first set of items in the delivery pipeline comprises placing at least one of the items corresponding to the first set of items on a delivery vehicle at the physical store and at least one of the items corresponding to the first set of items on a delivery vehicle at a warehouse separate from the physical store.

9. The method of claim 1, wherein placing the items corresponding to the first set of items in a delivery pipeline comprises automatically sending instructions to one or more manufacturers of the first set of items to send the items corresponding to the first set of items to the delivery address.

10. The method of claim 1, wherein the items to be purchased further comprise additional items to be delivered to a different delivery address from the first set of items, the method further comprising:
    determining, on the mobile device, the different delivery address for the additional items;
    identifying sets of items of the additional items wherein each identified set of items has a matching delivery address; and
    for each set of items with a matching delivery address, offering an option to deliver the set of items together.

11. The method of claim 1, wherein the first set of items are physical items and the delivery address is a postal address identifying a physical location.

12. A system comprising:
    a set of servers comprising one or more hardware processors configured to interact with an application of a mobile device to perform operations comprising:
    receiving an indication that the mobile device has entered a proximity of a physical store;
    accessing virtual shopping cart data associated with the mobile device, the virtual shopping cart data describing a plurality of items;
    selecting a set of items to be purchased, the set of items to be purchased comprising items from the plurality of items that are part of an inventory of the physical store;
    receiving, from the mobile device, while the mobile device is within the physical store, an identification, made using the mobile device, of an additional item in the physical store to be added to the items to be purchased, the items to be purchased comprising a first set of items to be delivered and a second set of items not to be delivered;

receiving, from the mobile device, a delivery address for a first set of items;

receiving payment for the first set of items and the second set of items in a single transaction;

placing items corresponding to the first set of items in a delivery pipeline for subsequent delivery to the delivery address; and determining that a customer is allowed to take the second set of items from the physical store.

13. The system of claim 12, wherein identifying an item to be purchased comprises scanning a visible identification code or image of the item to be purchased with an optical sensor of the mobile device.

14. The system of claim 12, wherein receiving the delivery address comprises receiving a command from the mobile device to use a default delivery address.

15. The system of claim 14, wherein receiving the delivery address further comprises sending a default delivery address to the mobile device before receiving the command.

16. The system of claim 12, wherein receiving the delivery address comprises receiving an entry of a delivery address on the mobile device.

17. The system of claim 12, wherein placing the items corresponding to the first set of items in the delivery pipeline comprises placing the items corresponding to the first set of items on a delivery vehicle at the physical store.

18. The system of claim 12, wherein placing the items corresponding to the first set of items in the delivery pipeline comprises placing the items corresponding to the first set of items on a delivery vehicle at a warehouse separate from the physical store.

19. The system of claim 12, wherein placing the items corresponding to the first set of items in the delivery pipeline comprises placing at least one of the items corresponding to the first set of items on a delivery vehicle at the physical store and at least one of the items corresponding to the first set of items on a delivery vehicle at a warehouse separate from the physical store.

20. The system of claim 12, wherein placing the items corresponding to the first set of items in a delivery pipeline comprises automatically sending instructions to one or more manufacturers of the first set of items to send the items corresponding to the first set of items to the delivery address.

21. The system of claim 12, wherein the items to be purchased further comprise additional items to be delivered to a different delivery address from the first set of items, the one or more hardware processors are further configured to:

determine, on the mobile device, the different delivery address for the additional items;

identify sets of items of the additional items wherein each identified set of items has a matching delivery address; and for each set of items with a matching delivery address, offer an option to deliver the set of items together.

22. The system of claim 12, wherein the first set of items are physical items and the delivery address is a postal address identifying a physical location.

\* \* \* \* \*